(12) United States Patent
Kounavis et al.

(10) Patent No.: US 7,844,655 B2
(45) Date of Patent: Nov. 30, 2010

(54) SYSTEM, METHOD AND APPARATUS FOR MULTIPLYING LARGE NUMBERS IN A SINGLE ITERATION USING GRAPHS

(75) Inventors: Michael E. Kounavis, Hillsboro, OR (US); Arun Raghunath, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1190 days.

(21) Appl. No.: 11/477,995

(22) Filed: Jun. 28, 2006

(65) Prior Publication Data

US 2008/0005218 A1    Jan. 3, 2008

(51) Int. Cl.
*G06F 7/52*    (2006.01)
(52) U.S. Cl. .......................................... 708/620
(58) Field of Classification Search ................ 708/620, 708/491–492
See application file for complete search history.

(56) References Cited

U.S. PATENT DOCUMENTS

| | | | |
|---|---|---|---|
| 5,317,755 A * | 5/1994 | Hartley et al. ................. 712/19 |
| 2003/0142818 A1* | 7/2003 | Raghunathan et al. ......... 380/1 |
| 2006/0176306 A1* | 8/2006 | Nagaraj et al. ............... 345/440 |
| 2006/0206554 A1* | 9/2006 | Lauter et al. ................ 708/492 |

* cited by examiner

*Primary Examiner*—Tan V Mai
(74) *Attorney, Agent, or Firm*—Blakely, Sokoloff, Taylor & Zafman LLP

(57) ABSTRACT

A computer is connected to a memory. The computer to execute an encryption program in the memory. The encryption program including a multiplication portion to perform multiplication of input operands. The multiplication portion includes graph based functions to generate coefficients representing products returned from the multiplication portion to generate encryption keys. Other embodiments are described and claimed.

27 Claims, 12 Drawing Sheets

| Operand Size | Paar and Weimerskirch | Montgomery | Embodiment | Schoolbook |
|---|---|---|---|---|
| 4 | 10 | N/A | 9 | 16 |
| 5 | 15 | 13 | 14 | 25 |
| 6 | 21 | 17 | 18 | 36 |
| 7 | 28 | 22 | 25 | 49 |
| 8 | 36 | N/A | 27 | 64 |
| 9 | 45 | N/A | 36 | 81 |
| 10 | 55 | N/A | 45 | 100 |
| 18 | 171 | N/A | 108 | 324 |
| 21 | 231 | N/A | 168 | 441 |
| 36 | 666 | N/A | 324 | 1296 |

FIG. 12

SYSTEM, METHOD AND APPARATUS FOR MULTIPLYING LARGE NUMBERS IN A SINGLE ITERATION USING GRAPHS

BACKGROUND

1. Field

The embodiments relate to processing operands, and in particular to a method, apparatus and system for processing large operands.

2. Description of the Related Art

The Karatsuba algorithm (A. Karatsuba and Y. Ofman, Multiplication of Multidigit Numbers on Automata, Soviet Physics-Doklady, 7 (1963), pages 595-596) was proposed in 1962 as an attempt to reduce the number of scalar multiplications required for computing the product of two large numbers. The classic algorithm accepts as input two polynomials of degree equal to 1, i.e., $a(x)=a_1 x+a_0$ and $b(x)=b_1 x+b_0$ and computes their product $a(x)b(x)=a_1 b_1 x^2+(a_1 b_0+a_0 b_1)x+a_0 b_0$ using three scalar multiplications. This technique is different from the naïve (also called the 'schoolbook') way of multiplying polynomials $a(x)$ and $b(x)$ which is to perform 4 scalar multiplications, i.e., find the products $a_0 b_0$, $a_0 b_1$, $a_1 b_0$ and $a_1 b_1$.

Karatsuba showed that you only need to do three scalar multiplications, i.e., you only need to find the products $a_1 b_1$, $(a_1+a_0)(b_1+b_0)$ and $a_0 b_0$. The missing coefficient $(a_1 b_0+a_0 b_1)$ can be computed as the difference $(a_1+a_0)(b_1+b_0)-a_0 b_0-a_1 b_1$ once scalar multiplications are performed. For operands of a larger size, the Karatsuba algorithm is applied recursively.

Karatsuba is not only applicable to polynomials but, also large numbers. Large numbers can be converted to polynomials by substituting any power of 2 with the variable x. One of the most important open problems associated with using Karatsuba is how to apply the algorithm to large numbers without having to lose processing time due to recursion. There are three reasons why recursion is not desirable. First, recursive Karatsuba processes interleave dependent additions with multiplications. As a result, recursive Karatsuba processes cannot take full advantage of any hardware-level parallelism supported by a processor architecture or chipset. Second, because of recursion, intermediate scalar terms produced by recursive Karatsuba need more than one processor word to be represented. Hence, a single scalar multiplication or addition requires more than one processor operation to be realized. Such overhead is significant. Third, recursive Karatsuba incurs the function call overhead.

Cetin Koc et. al. from Oregon Sate University (S. S. Erdem and C. K. Koc. "A less recursive variant of Karatsuba-Ofman algorithm for multiplying operands of size a power of two", *Proceedings, 16th IEEE Symposium on Computer Arithmetic*, J.-C. Bajard and M. Schulte, editors, pages 28-35, IEEE Computer Society Press, Santiago de Compostela, Spain, Jun. 15-18, 2003) describes a less recursive variant of Karatsuba where the size of the input operands needs to be a power of 2. This variant, however, still requires recursive invocations and only applies to operands of a particular size.

BRIEF DESCRIPTION OF THE DRAWINGS

The embodiments are illustrated by way of example, and not by way of limitation, in the figures of the accompanying drawings and in which like reference numerals refer to similar elements and in which:

FIG. 12 illustrates comparison of prior art processes with an embodiment.

DETAILED DESCRIPTION

The embodiments discussed herein generally relate to an apparatus, system and method for processing large numbers/operands. Referring to the figures, exemplary embodiments will now be described. The exemplary embodiments are provided to illustrate the embodiments and should not be construed as limiting the scope of the embodiments.

Figure 1:
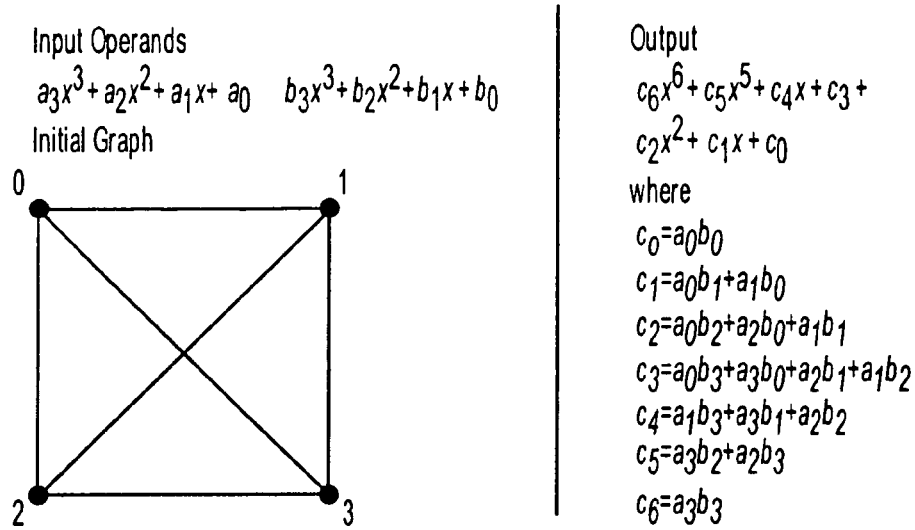
FIG. 1 illustrates flow of an embodiment of a process illustrating a 4 by 4 example.
Figure 1:
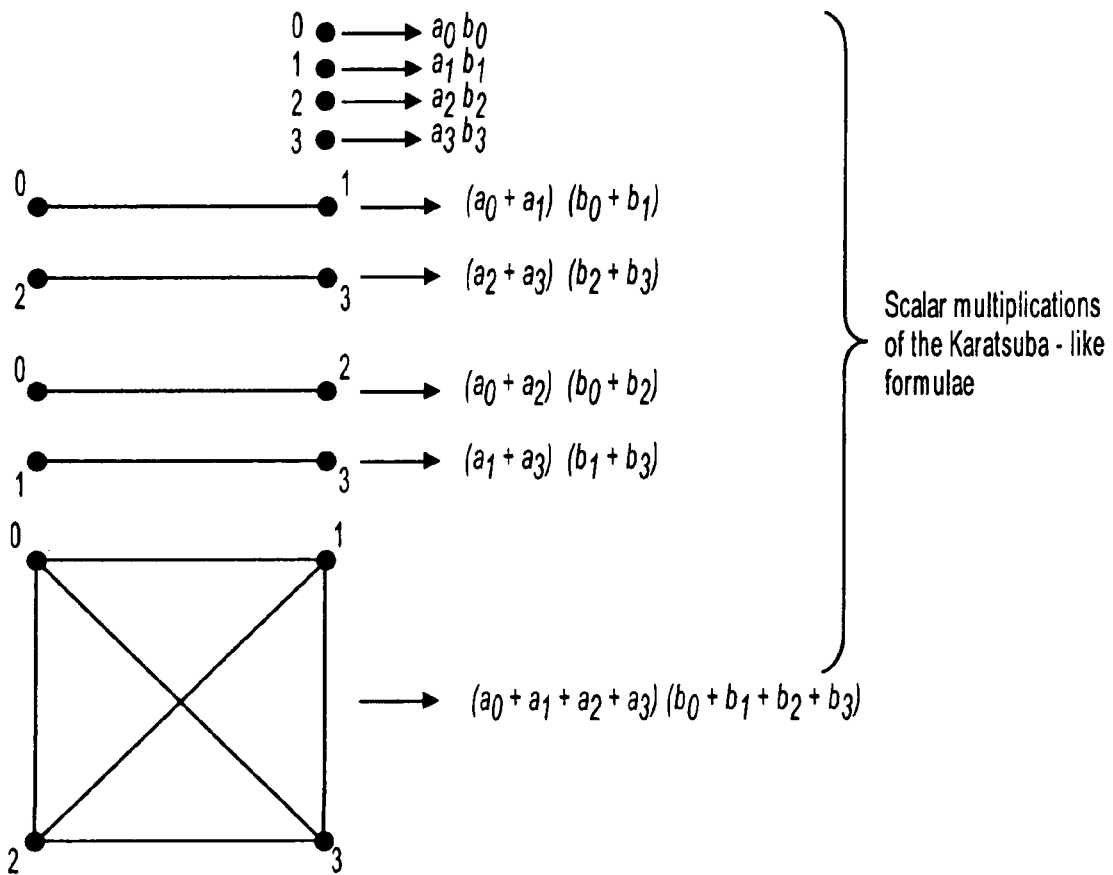
Figure 1:
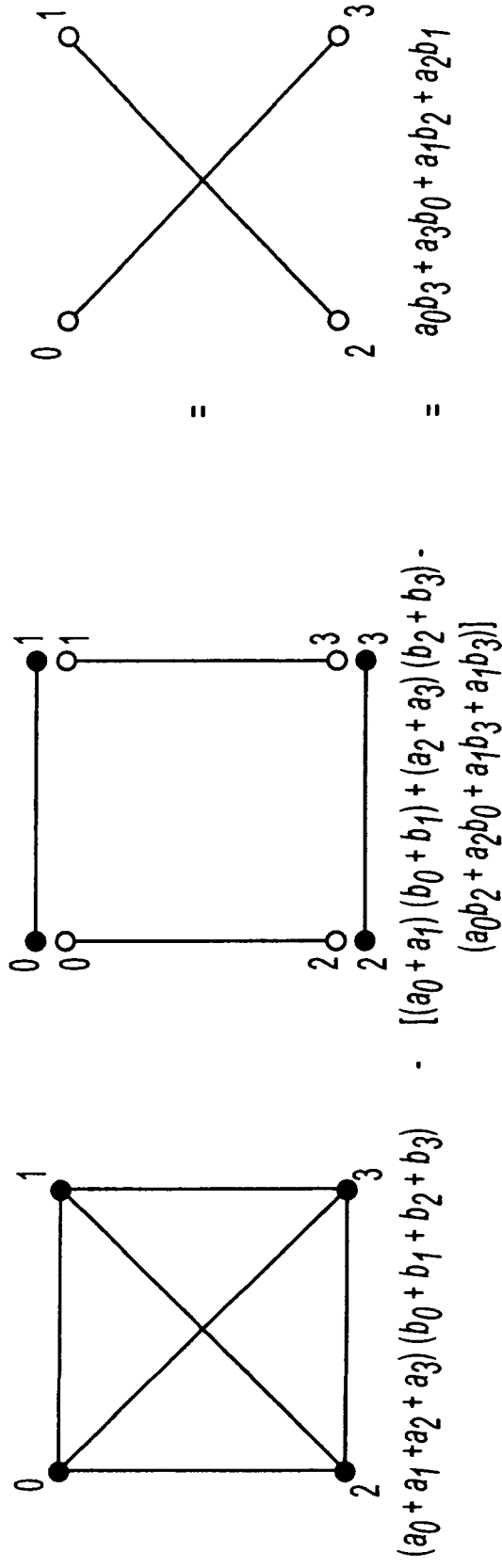

FIG. 1 illustrates an example of generating the terms of a 4 by 4 product using graphs using an embodiment. As illustrated in FIG. 1 the input operands are of size 4 words. In other embodiments, the operand size is the native operand size of a machine, such as a computing device (e.g., a computer). The operands are the polynomials $a(x)=a_3 x^3+a_2 x^2+a_1 x+a_0$ and $b(x)=b_3 x^3+b_2 x^2+b_1 x+b_0$. Because of the fact that the input operand size is 4 the embodiment builds a complete square. The vertices of the square are indexed 0, 1, 2, and 3 as illustrated in FIG. 1. The complete square is constructed in a first part of a process of an embodiment (see FIG. 11A). In a second part of a process of an embodiment, a set of complete sub-graphs are selected and each sub-graph is mapped to a scalar product (see FIG. 11B).

A complete sub-graph connecting vertices $i_0, i_2, \ldots, i_{m-1}$ is mapped to the scalar product $(a_{i_0}+a_{i_1}+ \ldots +a_{i_{m-1}}) \cdot (b_{i_0}+b_{i_1}+ \ldots +b_{i_{m-1}})$. The complete sub-graphs selected in the example illustrated in FIG. 1 are the vertices 0, 1, 2 and 3, the edges 0-1, 2-3, 0-2 and 1-3, and the entire square 0-1-2-3. The scalar products defined in the second part of the process are $a_0 b_0$, $a_1 b_1$, $a_2 b_2$, $a_3 b_3$, $(a_0+a_1)(b_0+b_1)$, $(a_2+a_3)(b_2+b_3)$, $(a_0+a_2)(b_0+b_2)$, $(a_1+a_3)(b_1+b_3)$, and $(a_0+a_1+a_2+a_3)(b_0+b_1+b_2+b_3)$. In the last part of the process a number of subtractions are performed (see FIG. 11B, 1165).

As an example, the edges 0-1 and 2-3 (with their adjacent vertices), and 0-2 and 1-3 (without their adjacent vertices) are subtracted from the complete square 0-1-2-3. What remains is the diagonals 0-3 and 1-2. These diagonals correspond to the term $a_1 b_2+a_2 b_1+a_3 b_0+a_0 b_3$, which is the coefficient of $x^3$ of the result. In one embodiment the differences produced by the subtractions of sets of formulae represent diagonals of complete graphs where the number of vertices in these graphs is a power of 2 (i.e., squares, cubes, hyper-cubes, etc.). The terms that result from the subtractions, if added to one another, create the coefficients of the final product.

To explain in more detail, the following definitions are first noted. N represents the size of the input (i.e., the number of terms in each input polynomial). N is the product of L integers $n_0, n_1, \ldots, n_{L-1}$. The number L represents the number of levels of multiplication.

$$N = n_0 \cdot n_1 \cdot \ldots \cdot n_{L-1} \qquad \text{Eq. 1}$$

For L levels, where a 'level' defines a set of complete graphs, the set of graphs of level l is represented as $G^{(l)}$. The cardinality of the set $G^{(l)}$ is represented as $|G^{(l)}|$. The i-th element of the set $G^{(l)}$ is represented as $G_i^{(l)}$. Each set of graphs $G^{(l)}$ has a finite number of elements. The cardinality of the set $G^{(l)}$ is defined as:

$$|G^{(l)}| = \begin{cases} \prod_{i=0}^{l-1} n_i, & l > 0 \\ 1, & l = 0 \end{cases} \qquad \text{Eq. 2}$$

Each element of the set $G^{(l)}$ is isomorphic to a complete graph $K_{n_i}$. The formal definition of the set of graphs $G^{(l)}$ is illustrated in Eq. 3:

$$G^{(l)} = \{G_i^{(l)} : i \in [0, |G^{(l)}|-1], G_i^{(l)} \cong K_{n_i}\} \qquad \text{Eq. 3}$$

Figure 2:
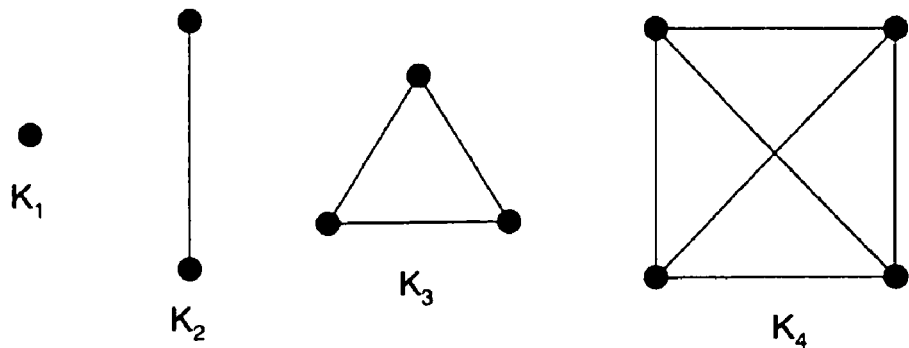
FIG. 2 illustrates examples of complete graphs.
Figure 3:
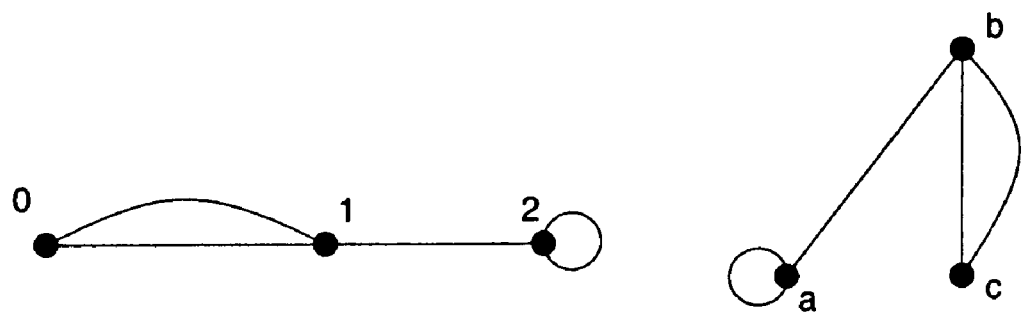
FIG. 3 illustrates examples of graph isomorphism.

A complete graph $K_a$ is a graph consisting of a vertices indexed $0, 1, 2, \ldots, a-1$, where each vertex is connected with each other vertex of the graph with an edge. FIG. 2 illustrates examples of complete graphs. Two graphs A and B are called isomorphic if there exists a vertex mapping functions and an edge mapping function $f_e$ such that for every edge e of A the function $f_v$ maps the endpoints of e to the endpoints of $f_e(e)$. Both the edge $f_e(e)$ and it endpoints belong to graph B. FIG. 3 illustrates an example of two isomorphic graphs.

In one embodiment an element of the set $G^{(l)}$ can be indexed in two ways. One way is by using a unique index i which can take all possible values between 0 and $|G^{(l)}|-1$, where the cardinality $|G^{(l)}|$ is given by Eq. 2. Such an element is represented as $G_i^{(l)}$. This way of representing graphs is denoted as a 'global index'. That is, the index used for representing a graph at a particular level is called global index.

Another way to index the element $G_i^{(l)}$ is by using a set of l indexes $i_0, i_1, \ldots i_{l-1}$, with l>0. This type of index sequence is denoted as a 'local index' sequence. In the trivial case where l=0, the local index sequence consists of one index only, which is equal to zero. The local indexes $i_0, i_1, \ldots, i_{l-1}$ are related with the global index i of a particular element $G_i^{(l)}$ in a manner illustrated in Eq. 4.

$$i = (((i_0 \cdot n_1) + i_1) \cdot n_2 + i_2) \cdot n_3 + \ldots + i_{l-1} \qquad \text{Eq. 4}$$

Eq. 4 can also be written in closed form as:

$$i = i_0 \cdot n_1 \cdot n_2 \cdot \ldots \cdot n_{l-1} + i_1 \cdot n_2 \cdot \ldots \cdot n_{l-1} + \ldots + i_{l-2} \cdot n_{l-1} + i_{l-1} = \sum_{j=0}^{l-1} \left( i_j \cdot \prod_{k=j+1}^{l-1} n_k \right) \qquad \text{Eq. 5}$$

The local indexes $i_0, i_1, \ldots, i_{l-1}$ satisfy the following inequalities:

$$0 \leq i_0 \leq n_0 - 1$$
$$0 \leq i_1 \leq n_1 - 1$$
$$\ldots 0 \leq i_{l-1} \leq n_{l-1} \qquad \text{Eq. 6}$$

In one embodiment the value of a global index i related to a local index sequence $i_0, i_1, \ldots, i_{l-1}$ is between 0 and $|G^{(l)}|$ if inequalities (6) hold and the cardinality $|G^{(l)}|$ is given by (2). This is proved by the following: from Eq. 4 it can be seen that i is a non-decreasing function of $i_0, i_1, \ldots, i_{l-1}$. Therefore, the smallest value of i is produced by setting each local index equal to zero. Therefore, the smallest i is zero. The highest value of i is obtained by setting each local index $i_0, i_1, \ldots, i_{l-1}$ to be equal to its maximum value. Substituting each local index $i_j$ with $n_j - 1$ for $0 \leq j \leq l-1$ results in:

$$i_{max} = \qquad \text{Eq. 7}$$
$$(n_0 - 1) \cdot n_1 \cdot n_2 \cdot \ldots \cdot n_{l-1} + (n_1 - 1) \cdot n_2 \cdot \ldots \cdot n_{l-1} + \ldots + n_{l-1} - 1 =$$
$$n_0 \cdot n_1 \cdot n_2 \cdot \ldots \cdot n_{l-1} - n_1 \cdot n_2 \cdot n_3 \cdot \ldots \cdot n_{l-1} + n_1 \cdot n_2 \cdot n_3 \cdot \ldots \cdot n_{l-1} -$$
$$n_2 \cdot n_3 \cdot n_4 \cdot \ldots \cdot n_{l-1} + n_2 \cdot n_3 \cdot n_4 \cdot \ldots \cdot n_{l-1} -$$
$$n_3 \cdot n_4 \cdot n_5 \cdot \ldots \cdot n_{l-1} + \ldots - n_{l-1} + n_{l-1} - 1 =$$
$$n_0 \cdot n_1 \cdot n_2 \cdot \ldots \cdot n_{l-1} - 1 = |G^{(l)}| - 1$$

In one embodiment for each global index i between 0 and $|G^{(l)}|-1$ there exists a unique sequence of local indexes $i_0, i_1, \ldots, i_{l-1}$ satisfying Eq. 5 and the inequalities in Eq. 6. This is proved by the following: to prove that for a global index i such that $0 \leq i \leq |G^{(l)}|-1$ there exists at least one sequence of local indexes $i_0, i_1, \ldots, i_{l-1}$ satisfying Eq. 5 and Eq. 6, in one embodiment, the following pseudo code represents the construction of such a sequence of local indexes:

---

LOCAL_INDEXES(i)

1. for j ← 0 to l − 1
2.     do if j + 1 ≤ l − 1
3.         then
4.             $i_j \leftarrow i \text{ div} \prod_{k=j+1}^{l-1} n_k$
5.             $i \leftarrow i \text{ mod} \prod_{k=j+1}^{l-1} n_k$
6.         else
7.             $i_j \leftarrow i \text{ mod } n_{l-1}$
8. return$\{i_0, i_1, \ldots, i_{l-1}\}$

---

It can be seen that the local index sequence $i_0, i_1, \ldots, i_{l-1}$ produced by the LOCAL_INDEXES satisfies both Eq. 5 and the inequalities in Eq. 6. Therefore, the existence of a local index sequence associated with a global index is proven.

To prove the uniqueness of the local index sequence, it is noted that if two sequences $i_0, i_1, \ldots, i_{l-1}$ and $i_0', i_1', \ldots i_{l-1}'$, satisfy Eq. 5 and Eq. 6, then it is not possible for some index q, $0 \leq q \leq l-1$, to have $i_q' \neq i_q$. Assume the opposite, i.e., that there are m indexes $q_0, q_1, \ldots, q_{m-1}$ such that $i_{q_0}' \neq i_{q_0}$, $i_{q_1}' \neq i_{q_1}, \ldots, i_{q_{m-1}}'$. Also assume that that for all other indexes the sequences $i_0, i_1, \ldots, i_{l-1}$ and $i_0', i_1', \ldots, i_{l-1}'$ are identical. Since both sequences satisfy Eq. 5 the following identity is true:

$$(i_{q_0} - i_{q_0}') \cdot n_{q_0+1} \cdot \ldots \cdot n_{l-1} + (i_{q_1} - i_{q_1}') \cdot n_{q_1+1} \cdot$$
$$\cdot n_{l-1} + \ldots + (i_{q_{m-1}} - i_{q_{m-1}}') \cdot n_{q_{m-1}+1} \cdot \ldots \cdot n_{l-1} = 0 \qquad \text{Eq. 8}$$

Without loss of generality, assume that $q_0 < q_1 < \ldots < q_{m-1}$. The number $(i_{q_0} - i_{q_0}') \cdot n_{q_0+1} \cdot \ldots \cdot n_{l-1}$ is clearly a multiple of $n_{q_0+1} \cdots n_{l-1}$. The addition of the term $(i_{q_1} - i_{q_1}') \cdot n_{q_1+1} \cdots n_{l-1}$ to this number is not possible to make the sum $(i_{q_0} - i_{q_0}') \cdot n_{q_0+1} \cdots n_{l-1+(i_{q_1} - i_{q_1}')} \cdot n_{q_1+1} \cdots n_{l-1}$ equal to zero since $|i_{q_1} - i_{q_1}'| \leq n_{q_1} - 1 < n_{q_1} \leq n_{q_{0+1}} \cdots n_{q_1}$. The same can be said about the addition of all other terms up to $(i_{q_{m-1}} - i_{q_{m-1}}') \cdot n_{q_{m-1}+1} \cdots n_{l-1}$. As a result, it is not possible for Eq. 8 to hold. Therefore, the uniqueness of the local index sequence is proven.

The following notation is used to represent a graph associated with global index i and local index sequence $i_0$, $i_1, \ldots, i_{l-1}$.

$$G_i^{(l)} = G_{(i_0)(i_1)\ldots(i_{l-1})}^{(l)} \qquad \text{Eq. 9}$$

Consider the graph $G_i^{(l)}$ (or $G_{(i_0)(i_1)\ldots(i_{l-1})}^{(l)}$) of level l. This graph is by definition isomorphic to $K_{n_l}$. This means that this graph consists of $n_l$ vertices and $n_l \cdot (n_l - 1)/2$ edges, where each vertex is connected to every other vertex with an edge. The set $V_i^{(l)}$ (or $V_{(i_0)(i_1)\ldots(i_{l-1})}^{(l)}$) is defined as the set of all vertices of the graph $G_i^{(l)}$ (or $G_{(i_0)(i_1)\ldots(i_{l-1})}^{(l)}$). In one embodiment three alternative ways are used to represent the vertices of a graph. One way is using the local index sequence notation. The $i_l$-th vertex of a graph $G_{(i_0)(i_1)\ldots(i_{l-1})}^{(l)}$ is represented as $v_{(i_0)(i_1)\ldots(i_{l-1})}^{(l)}$, where $0 \leq i_l \leq n_l - 1$. Using the local index sequence notation, the set of all vertices of a graph $G_{(i_0)(i_1)\ldots(i_{l-1})}^{(l)}$ is defined as:

$$V_{(i_0)(i_1)\ldots(i_{l-1})}^{(l)} = \{v_{(i_0)(i_1)\ldots(i_{l-1})}^{(l)} : 0 \leq i_l \leq n_l - 1\} \qquad \text{Eq. 10}$$

A second way to represent the vertices of a graph is using a 'semi-local' index sequence notation. In one embodiment a semi-local index sequence consists of a global index of a graph and a local index associated with a vertex. Using the semi-local index sequence notation, the $i_l$-th vertex of a graph $G_i^{(l)}$ is represented as $v_{i,i_l}^{(l)}$, where $0 \leq i_l \leq n_l - 1$. In this way, the set of all vertices of a graph $G_i^{(l)}$ is defined as:

$$V_i^{(l)} = \{v_{i,i_l}^{(l)} : 0 \leq i_l \leq n_l - 1\} \qquad \text{Eq. 11}$$

In one embodiment, for each vertex $v_{i,i_l}^{(l)}$ a unique global index $i_g \leftarrow i \cdot n_l + i_l$ is assigned. It is shown that $0 \leq i_g \leq |G^{(l+1)}| - 1$ and for every semi-local index sequence i, $i_l$ there exists a unique global index $i_g$ such that $i_g = i \cdot n_l + i_l$; also for every global index $i_g$ there exists a unique semi-local index sequence i, $i_l$ such that $i_g = i \cdot n_l + i_l$.

Substituting i with $$\sum_{j=0}^{l-1} \left( i_j \cdot \prod_{k=j+1}^{l-1} n_k \right)$$

according to Eq. 5, the global index $i_g$ of a vertex is associated with a local index sequence $i_0, i_1, \ldots, i_{l-1}, i_l$. The indexes $i_0$, $i_1, \ldots, i_{l-1}$ characterize the graph that contains the vertex whereas the index $i_l$ characterizes the vertex itself. The relationship between $i_g$ and $i_0, i_1, \ldots, i_{l-1}, i_l$ is given in Eq. 12:

$$i_g = \sum_{j=0}^{l} \left( i_j \cdot \prod_{k=j+1}^{l} n_k \right) \qquad \text{Eq. 12}$$

In one embodiment a global index $i_g$ associated with some vertex of a graph at level l has an one-to-one correspondence to a unique sequence of local indexes $i_0, i_1, \ldots, i_{l-1}, i_l$ satisfying identity (12), the inequalities (6) and $0 \leq i_l \leq n_l - 1$.

Using the global index notation, the set of all vertices of a graph $G_i^{(l)}$ (or $G_{(i_0)(i_1)\ldots(i_{l-1})}^{(l)}$) is defined as:

$$V_i^{(l)} = \{v_{i_g}^{(l)} : i_g = i \cdot n_l + i_l, 0 \leq i_l \leq n_l - 1\} \qquad \text{Eq. 13}$$

or $$V_{(i_0)(i_1)\ldots(i_{l-1})}^{(l)} = \left\{ v_{i_g}^{(l)} : i_g = \sum_{j=0}^{l} \left( i_j \cdot \prod_{k=j+1}^{l} n_k \right), 0 \leq i_l \leq n_l - 1 \right\} \qquad \text{Eq. 14}$$

The edge which connects two vertices $v_j^{(l)}$ and $v_k^{(l)}$ of a graph at level l is represented as $e_{j-k}^{(l)}$. If two vertices $v_{i,i_l}^{(l)}$ and $v_{i,i_l'}^{(l)}$ are represented using the semi-local index sequence notation, the edge which connects these two vertices is represented as $e_{i,i_l-i,i_l'}^{(l)}$. Finally, if two vertices $v_{(i_0)(i_1)\ldots(i_{l-1})}^{(l)}$ and $v_{(i_0)(i_1)\ldots(i_{l-1})}^{(l)}$ are represented using the local index sequence notation, the edge which connects these two vertices is represented as $e_{(i_0)(i_1)\ldots(i_{l-1})(i_l)-(i_0)(i_{l-1})(i_l')}^{(l)}$ x. The set of all edges of a graph $G_i^{(l)}$ (or $G_{(i_0)(i_1)\ldots(i_{l-1})}^{(l)}$) is represented as $E_i^{(l)}$ (or $E_{(i_0)(i_1)\ldots(i_{l-1})}^{(l)}$). This set is formally defined as:

$$E_{(i_0)(i_1)\ldots(i_{l-1})}^{(l)} = \{e_{(i_0)(i_1)\ldots(i_{l-1})(i_l)-(i_0)(i_1)\ldots(i_{l-1})(i_l')}^{(l)} : 0 \leq i_l \leq n_l - 1, 0 \leq i_l' \leq n_l - 1, i_l \neq i_l'\} \qquad \text{Eq. 15}$$

or $$E_i^{(l)} = \{e_{i,i_l-i,i_l'}^{(l)} : 0 \leq i_l \leq n_l - 1, 0 \leq i_l' \leq n_l - 1, i_l \neq i_l'\} \qquad \text{Eq. 16}$$

or $$E_i^{(l)} = \{e_{i_g-i_g'}^{(l)} : i_g = i \cdot n_l + i_l, i_g' = i \cdot n_l + i_l', 0 \leq i_l \leq n_l - 1, 0 \leq i_l' \leq n_l - 1, i_l \neq i_l'\} \qquad \text{Eq. 17}$$

In one embodiment, the notation used for edges between vertices of different graphs of the same level is the same as the notation used for edges between vertices of the same graph. For example, an edge connecting two vertices $v_{(i_0)(i_1)\ldots(i_{l-1})(i_l)}^{(l)}$ and $v_{(i_0')(i_1')\ldots(i_{l-1}')(i_l')}^{(l)}$, which are represented using the local index sequence notation is denoted as $e_{(i_0)(i_1)\ldots(i_{l-1})(i_l)-(i_0')(i_1')\ldots(i_{l-1}')(i_l')}^{(l)}$.

In one embodiment alternative notations for the sets of vertices and edges of a graph G are V(G) and E(G) respectively. In addition, the term 'simple' from graph theory is used to refer to graphs, vertices and edges associated with the last level L−1. The graphs, vertices and edges of all other levels l, l<L−1 are referred to as 'generalized'. The level associated with a particular graph G, vertex v or edge e is denoted as l(G), l(v) or l(e) respectively.

A vertex to graph mapping function $f^{v \to g}$ is defined as a function that accepts as input a vertex of a graph at a particular level l, l<L−1 and returns a graph at a next level l+1 that is associated with the same global index or local index sequence as the input vertex.

$$f^{v \to g}(v_{i,i_l}^{(l)}) = G_{n_l \cdot i + i_l}^{(l+1)} \qquad \text{Eq. 18}$$

Alternative definitions of the function $f^{v \to g}$ are:

$$f^{v \to g}(v_i^{(l)}) = G_i^{(l+1)} \qquad \text{Eq. 19}$$

and $$f^{v \to g}(v_{(i_0)(i_1)\ldots(i_{l-1})(i_l)}^{(l)}) = G_{(i_0)(i_1)\ldots(i_{l-1})(i_l)}^{(l+1)} \qquad \text{Eq. 20}$$

Similarly, a graph to vertex mapping function $f_{g \to v}$ is defined as a function that accepts as input a graph at a particular level l, l>0 and returns a vertex at a previous level l−1 that is associated with the same global index or local index sequence as the input graph.

$$f^{g \to v}(G_i^{(l)}) = v_{\lfloor i/n_{l-1} \rfloor, i \bmod n_{l-1}}^{(l-1)} \qquad \text{Eq. 21}$$

Alternative definitions of the function $f^{g \to v}$ are:

$$f^{g \to v}(G_i^{(l)}) = v_i^{(l-1)} \qquad \text{Eq. 22}$$

and $$f^{g \to v}(G_{(i_0)(i_1)\ldots(i_{l-1})}^{(l)}) = v_{(i_0)(i_1)\ldots(i_{l-1})} \qquad \text{Eq. 23}$$

The significance of the vertex to graph and graph to vertex mapping functions lies on the fact that they allow us to represent pictorially all graphs of all levels defined for a particular operand input size. First, each vertex of a graph is represented as a circle. Second, inside each circle, a graph is drawn at the next level, which maps to the vertex represented by the circle. As an example, FIG. 4 illustrates how the graphs are drawn defined for an 18 by 18 multiplication.

Figure 4:
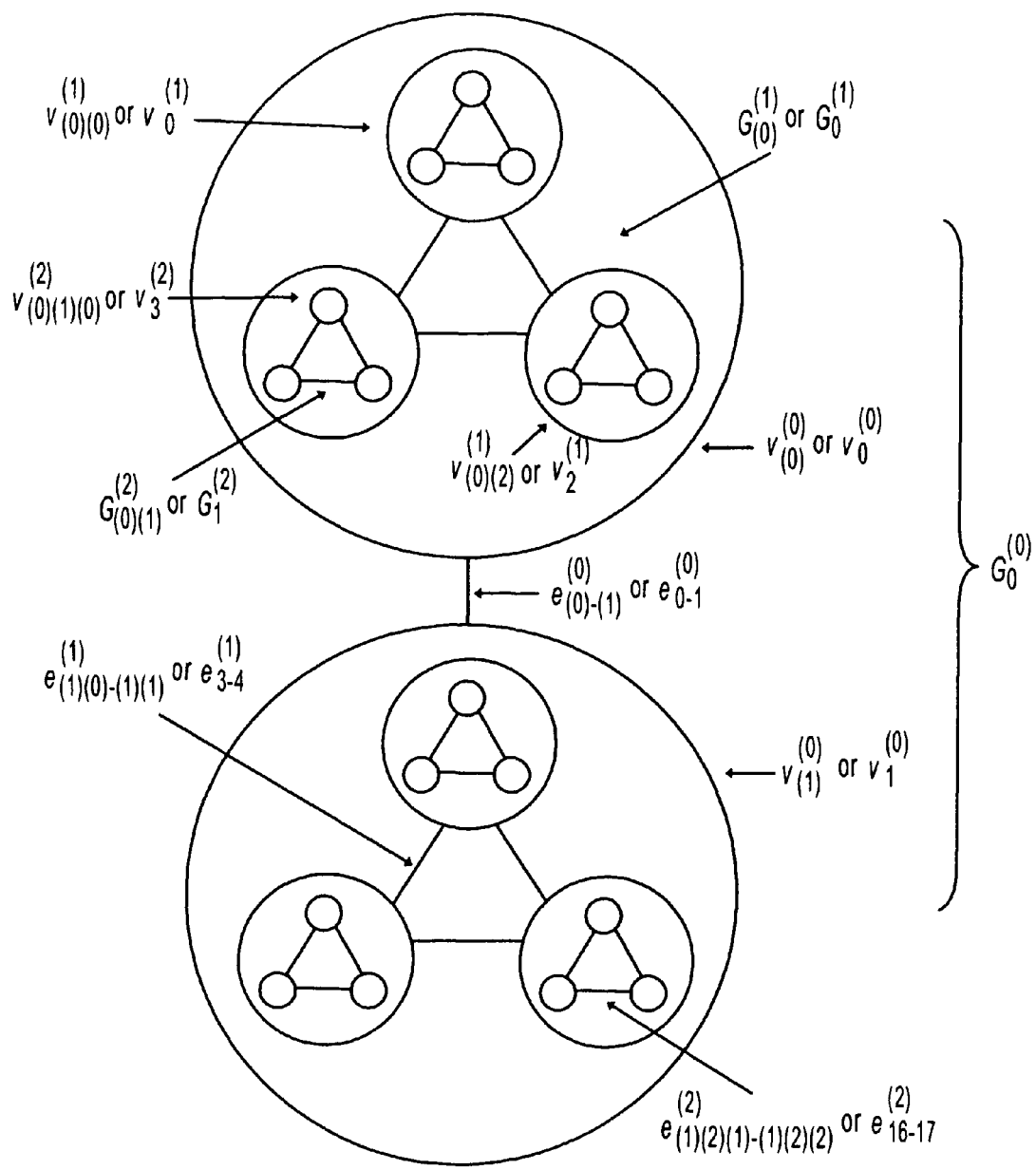
FIG. 4 illustrates graph representations of an embodiment for an 18 by 18 example.

In the example illustrated in FIG. 4, N=18. N can be written as the product of three factors, i.e., 2, 3 and 3. Setting the number of levels L to be equal to 3 and $n_0=2$, $n_1=n_2=3$, the graphs are drawn for all levels associated with the multiplication as shown in FIG. 4. It can be seen that the vertices of the graphs at the last level do not contain any other graphs. This is the reason they are called 'simple'. It can also be seen that each vertex at a particular level contains as many sets of graphs as the number of levels below. This is the reason why sets of graphs are referred to as 'levels'.

In one embodiment the term 'spanning' is overloaded from graph theory. The term spanning is used to refer to edges or collections of edges that connect vertices of different graphs at a particular level.

A spanning plane is defined as a graph resulting from the join '+' operation between two sub-graphs of two different graphs of the same level. Each of the two sub-graphs consists of a single edge connecting two vertices. Such two sub-graphs are described below:

$$\{\{v_{(i_0)(i_1)\ldots(i_{l-1})(i_l)}^{(l)}, v_{(i_0)(i_1)\ldots(i_{l-1})(i_l)}^{(l)}\}, e_{(i_0)(i_1)\ldots(i_{l-1})(i_l)-(i_0)\ldots(i_{l-1})(i_l)}\}, \text{ and}$$

$$\{\{v_{(i_0')(i_1')\ldots(i_{l-1}')(i_l')}^{(l)}, v_{(i_0')(i_1')\ldots(i_{l-1}')(i_l')}^{(l)}\}, e_{(i_0')(i_1')\ldots(i_{l-1}')(i_l')-(i_0')(i_1')\ldots(i_{l-1}')(i_l')}\} \qquad \text{Eq. 24}$$

In addition, the local index sequences characterizing the two edges which are joined for producing a spanning plane need to satisfy the following conditions:

$$i_0=i_0', i_1=i_1', \ldots, i_q \neq i_q', \ldots, i_l=i_l', \hat{i}_l=\hat{i}_l' \qquad \text{Eq. 25}$$

Eq. 25 can be also written in closed form as follows:

$$(\exists q, q \in [0, l-1]: i_q \neq i_q') \wedge (\forall j \in [0, l], j \neq q: i_j=i_j') \wedge (\hat{i}_l=\hat{i}_l') \qquad \text{Eq. 26}$$

Eq. 25 or Eq. 26 indicate that all corresponding local indexes of the joined edges in a spanning plane are identical apart from the indexes in a position q, where $0 \leq q \leq l-1$. Since $i_q \neq i_q'$, this means that the two edges that are joined to form a spanning plane are associated with different graphs. In the special case where q=l−1, the two graphs containing the joined edges of a spanning plane map to vertices of the same graph at level l−1, since $i_0=i_0'$, $i_1=i_1'$, ..., $i_{l-2}=i_{l-2}'$.

Figure 5:
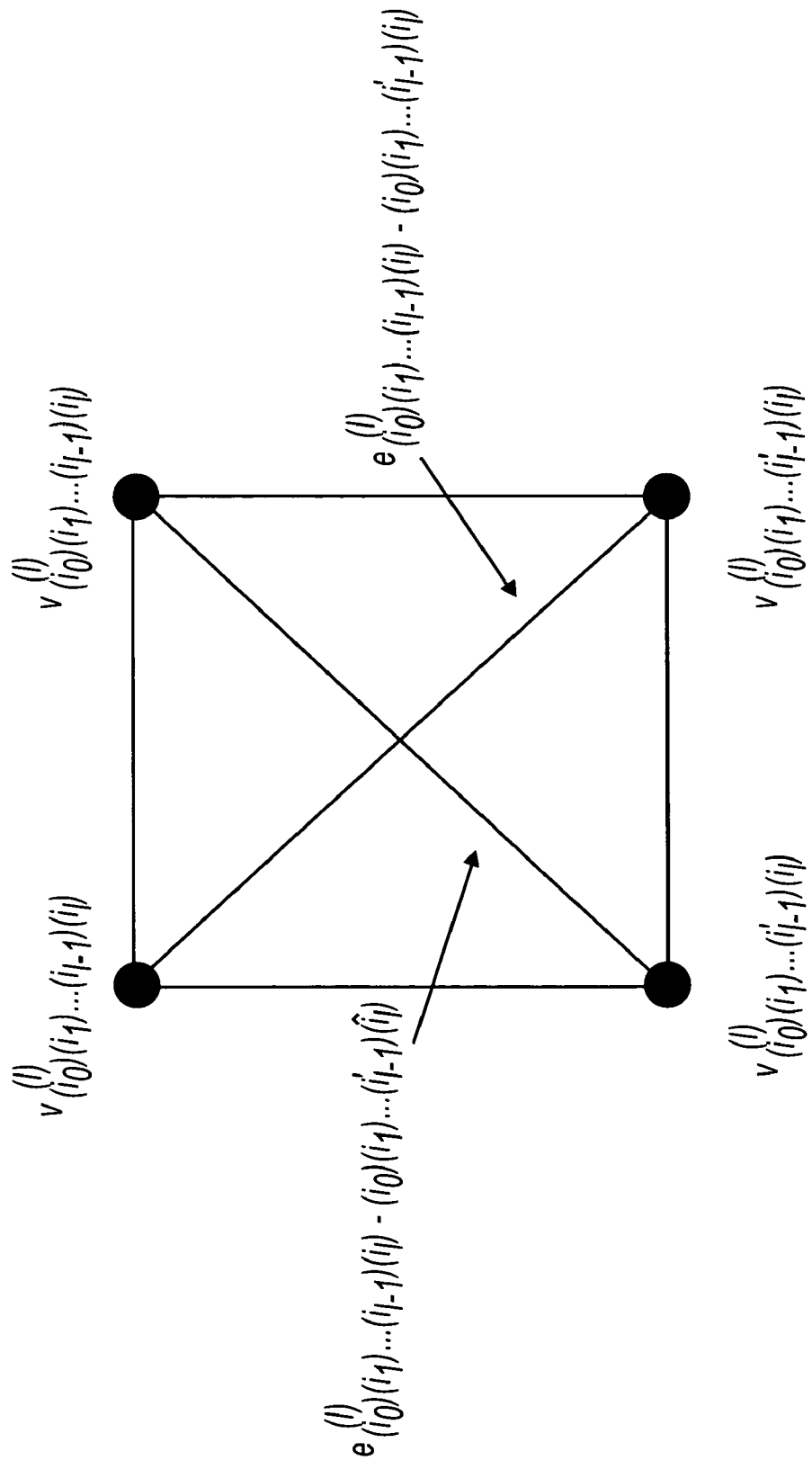
FIG. 5 illustrates a representation of a spanning plane of an embodiment using a local index sequence notation.

The join operation '+' between two graphs is defined as a new graph consisting of the two operands of '+' plus new edges connecting every vertex of the first operand to every vertex of the second operand. A spanning plane produced by joining the two sub-graphs of Eq. 24 with Eq. 26 holding and q=l−1 is illustrated in FIG. 5. As illustrated in FIG. 5, vertices and edges are represented using the local index sequence notation.

Using the local index sequence notation, a spanning plane can be formally defined as:

$$s_{(i_0)(i_1)\ldots(i_q-i_q')\ldots(i_{l-1})(i_l-i_l')}^{p(l)} = \{\{v_{(i_0)\ldots(i_q)\ldots(i_{l-1})(i_l)}^{(l)}, v_{(i_0)\ldots(i_q)\ldots(i_{l-1})(i_l)}^{(l)}\},$$

$$e_{(i_0)\ldots(i_q)\ldots(i_{l-1})(i_l)-(i_0)\ldots(i_q')\ldots(i_{l-1})(i_l)}^{(l)}\} + \{\{v_{(i_0)\ldots(i_q')\ldots(i_{l-1})(i_l)}^{(l)}, v_{(i_0)\ldots(i_q')\ldots(i_{l-1})(i_l)}^{(l)}\},$$

$$e_{(i_0)\ldots(i_q')\ldots(i_{l-1})(i_l)-(i_0)\ldots(i_q')\ldots(i_{l-1})(i_l)}^{(l)}\} \qquad \text{Eq. 27}$$

Since the local index sequence notation is lengthy, the shorter 'semi-local' index sequence notation is used for representing a spanning plane:

$$s_{i,i_l-i,i_l-i',i_l-i',\hat{i}_l}^{p(l)} = \{\{i,i_l^{(l)}\}, e_{i,i_l-i,i_l}^{(l)}\} + \{\{v_{i',i_l}^{(l)}, v_{i',i_l}^{(l)}\}, e_{i',i_l-i',i_l}^{(l)}\} \qquad \text{EQ. 28}$$

In the definition of Eq. 28 above, the value of the index i is given by identity Eq. 5 and:

$$i' = i_0 \cdot n_1 \cdot n_2 \cdots n_{l-1} + i_1 \cdot n_2 \cdots n_{l-1} + \ldots + i_q' \cdot n_{q+1} \cdots + i_{l-2} \cdot n_{l-1} + i_{l-1} \qquad \text{Eq. 29}$$

In one embodiment global index notation is used for representing a spanning plane. Using the global index notation, a spanning plane is defined as:

$$s_{i_g-\hat{i}_g-i_g'-\hat{i}_g'}^{p(l)} = \{\{v_{i_g}^{(l)}, v_{i_g}^{(l)}\}, e_{i_g-i_g}^{(l)}\} + \{\{v_{i_g'}^{(l)}, v_{i_g'}^{(l)}\}, e_{i_g'-i_g'}^{(l)}\} \qquad \text{Eq. 30}$$

In the Eq. 30 notation above:

$$i_g = i \cdot n_l + i_l, \hat{i}_g = i \cdot n_l + \hat{i}_l, i_g' = i' \cdot n_l + i_l, \hat{i}_g' = i' \cdot n_l + \hat{i}_l \qquad \text{Eq. 31}$$

Figure 6:
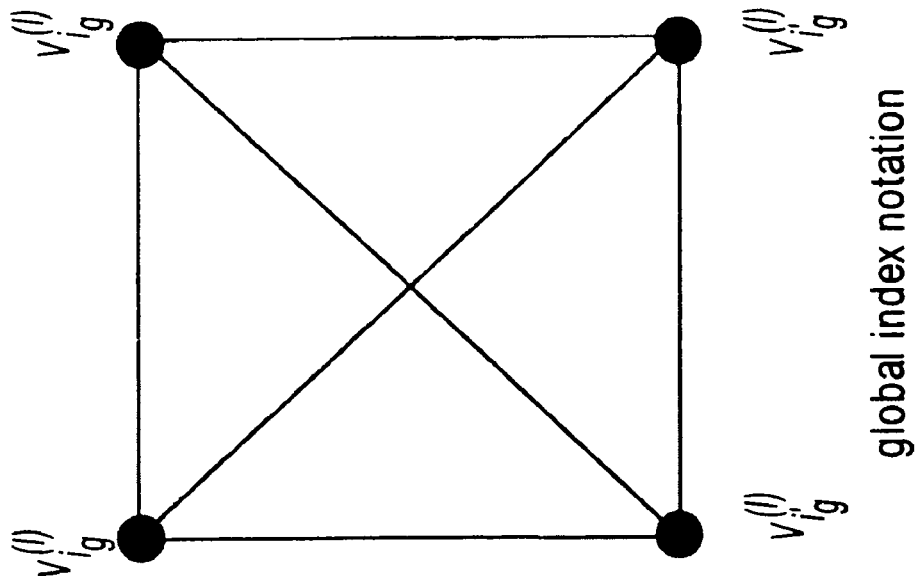
FIG. 6 illustrates a representation of spanning planes of an embodiment using a semi-local index sequence and global index notations.
Figure 6:
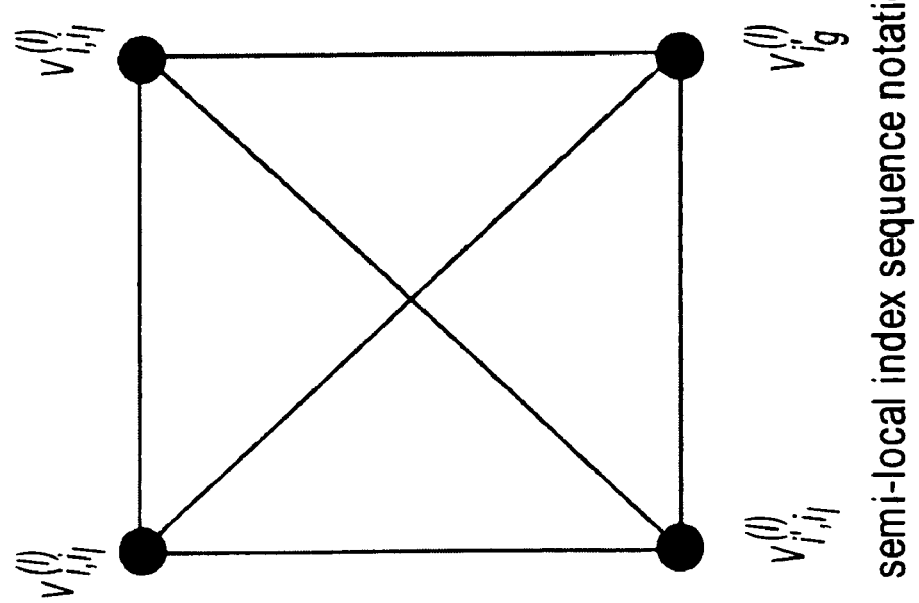

The index i in identity (31) is given by identity (5) whereas the index i' in (31) is given by identity (29). A pictorial representation of spanning planes using the semi-local index sequence and global index notations is given in FIG. 6.

Figure 7:
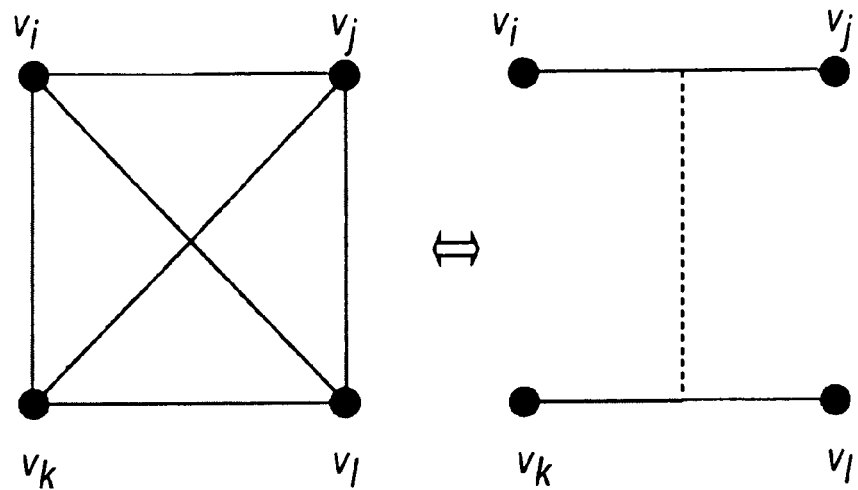
FIG. 7 illustrates an alternative representation of a spanning plane.

In another embodiment, an alternative pictorial representation of a spanning plane used as illustrated in FIG. 7. The vertices shown in FIG. 7 are represented using the global index notation. The level of the vertices is omitted for simplicity.

Figure 8:
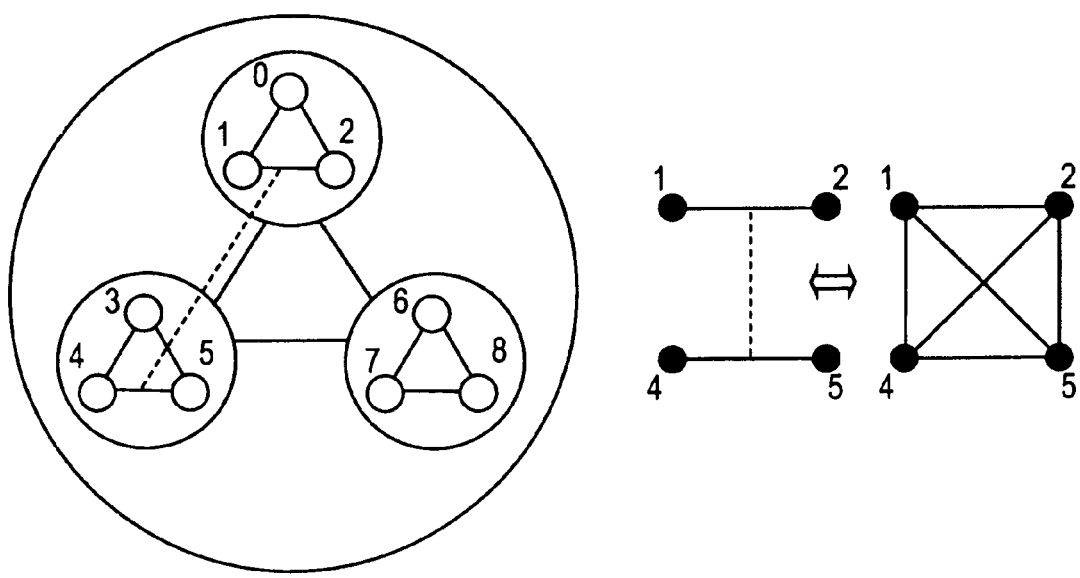
FIG. 8 illustrates another example of a 9 by 9 spanning plane.

An example of a spanning plane is illustrated in FIG. 8. The example shows the graphs built for an 9-by-9 multiplication and the global indexes of all simple vertices. The example also shows the spanning plane defined by the edges $e_{l-2}^{(1)}$ and $e_{4-5}^{(1)}$.

A spanning edge is an edge that connects two vertices $v_{(i_0)(i_1)\ldots(i_{l-1})(i_l)}^{(l)}$ and $v_{(i_0')(i_1')\ldots(i_{l-1}')(i_l)}^{(l)}$ of different graphs of the same level. The local index sequences $i_0, i_1, \ldots, i_l$ and $i_0'$, $i_1'$, ..., $i_l'$ which describe the two vertices need to satisfy the following conditions:

$$i_0=i_0', i_1=i_1', \ldots, i_q \neq i_q', \ldots, i_l=i_l' \qquad \text{Eq. 32}$$

or (in closed form):

$$(\exists q, q \in [0, l-1]: i_q \neq i_q') \wedge (\forall j \in [0, l], j \neq q: i_j=i_j') \qquad \text{Eq. 33}$$

From the conditions in Eq. 33 it is evident that a spanning edge connects vertices with the same last local index ($i_l = i_l'$). Second, the vertices which are endpoints of a spanning edge are associated with different graphs of $G^{(l)}$ since $i_q \neq i_q'$. Third, in the special case where q=l−1, the two graphs containing the endpoints of a spanning edge map to vertices of the same graph at level l−1, since $$i_0=i_0', i_l=i_1', \ldots, i_{l-2}=i_{l-2}'.$$

A spanning edge can be represented formally using the local index sequence notation as follows:

$$s_{(i_0)(i_1)\ldots(i_q-i_q')\ldots(i_l)}^{e(l)} = \{v_{(i_0)(i_1)\ldots(i_q)\ldots(i_l)}^{(l)}\} + \{v_{(i_0)(i_1)\ldots(i_q')\ldots(i_l)}^{(l)}\} = \{\{v_{(i_0)(i_1)\ldots(i_q)\ldots(i_l)}^{(l)}, v_{(i_0)(i_1)\ldots(i_q')\ldots(i_l)}^{(l)}\}, e_{(i_0)(i_1)\ldots(i_q)\ldots(i_l)-(i_0)\ldots(i_q')\ldots(i_l)}^{(l)}\} \qquad \text{Eq. 34}$$

A spanning edge can be also represented formally using the semi-local index sequence notation:

$$s_{i_g-i_g'}^{e(l)} = \{v_{i_g}^{(l)}\} + \{v_{i_g'}^{(l)}\} = \{\{v_{i_g}^{(l)}, v_{i_g'}^{(l)}\}, e_{i_g-i_g'}^{(l)}\} \qquad \text{Eq. 35}$$

In the definition in Eq. 35, the value of the index i is given by identity shown in Eq. 5 and:

$$i' = i_0 \cdot n_1 \cdot n_2 \cdots n_{l-1} + i_l \cdot n_2 \cdots n_{l-1} + \ldots + i_q' \cdot n_{q+1} \cdots n_{l-1} + \ldots + i_{l-2} \cdot n_{l-1} + i_{l-1} \quad \text{Eq. 36}$$

In another embodiment a third way to represent a spanning edge is by using the global index notation:

$$s_{i_g - i_g'}^{e(l)} = \{v_{i_g}^{(l)}\} + \{v_{i_g'}^{(l)}\} = \{\{v_{i_g}^{(l)}, v_{i_g'}^{(l)}\}, e_{i_g - i_g'}^{(l)}\} \quad \text{Eq. 37}$$

To further aid in understanding, a set of mappings defined between edges, spanning edges and spanning planes are introduced. In what follows the term 'corresponding' is used to refer to vertices of different graphs of the same level that are associated with the same last local index. Two edges of different graphs of the same level are called 'corresponding' if they are connecting corresponding endpoints.

A generalized edge (i.e., an edge of a graph $G_i^{(l)}$, $0 \le l \le L-1$) or a spanning edge can map to a set of spanning edges and spanning planes through a mapping function $f^{e \to s}$. The function $f_{e \to s}$ accepts as input an edge (if it is a spanning edge, the endpoints are excluded) and returns the set of all possible spanning edges and spanning planes that can be considered between the corresponding vertices and edges of the graphs that map to the endpoints of the input edge through the function $f_{v \to g}$.

Figure 9:
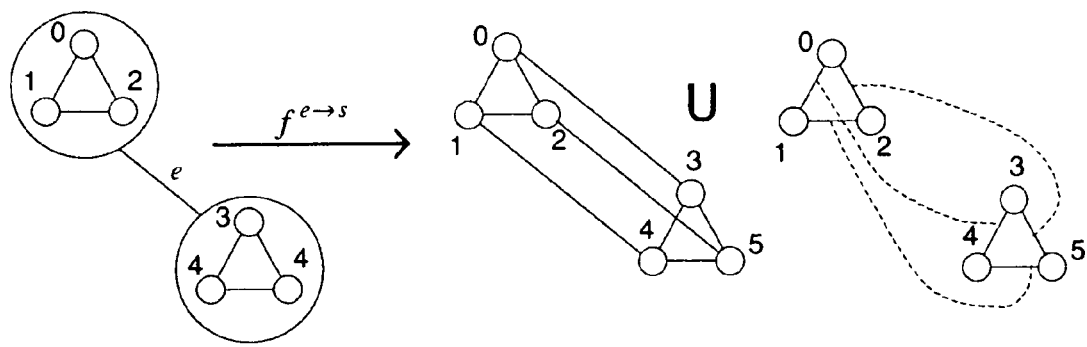
FIG. 9 illustrates an embodiment representation of edge to spanning edge, and spanning plane mapping.

Before the $f^{e \to s}$ mapping is described formally an example is introduced. In the example illustrated in FIG. 9, the generalized edge e (its level and indexes are omitted for simplicity) connects two vertices that map to the triangles 0-1-2 and 3-4-5. This mapping is done through the function $f^{v \to g}$. Edge e maps to three spanning edges and three spanning planes as shown in FIG. 9 through the function $f^{e \to s}$. The spanning edges are those connecting the vertices with global indexes 0 and 3, 1 and 4, and 2 and 5 respectively. The spanning planes are those which are produced by the join operation between edges 0-1 and 3-4, 0-2 and 3-5, and 1-2 and 4-5 respectively.

Using the local index sequence location the function $f^{e \to s}$ can be formally defined as:

$$f^{e \to s}(e_{(i_0)\ldots(i_q)\ldots(i_{l-1})(i_l)-(i_0)\ldots(i_q')\ldots(i_{l-1})(i_l)}^{(l)}) = \{s_{(i_0)\ldots(i_q - i_q')\ldots(i_{l-1})(i_l)(j)}^{e(l+1)} : 0 \le j \le n_{l+1}-1\} \cup \{s_{(i_0)\ldots(i_q - i_q')\ldots(i_{l-1})(i_l)(j-k)}^{p(l+1)} : 0 \le j \le n_{l+1}-1, 0 \le k \le n_{l+1}-1, j \ne k\} \quad \text{Eq. 38}$$

In the definition in Eq. 38 the index position q takes all possible values from the set [0, 1].

The mapping $f^{e \to s^e}$ is defined between edges and spanning edges only and the mapping $f^{e \to s^p}$ is defined between edges and spanning planes only.

$$f^{e \to s^e}(e_{(i_0)\ldots(i_q)\ldots(i_{l-1})(i_l)-(i_0)\ldots(i_q')\ldots(i_{l-1})(i_l)}^{(l)}) = \{s_{(i_0)\ldots(i_q - i_q')\ldots(i_{l-1})(i_l)(j)}^{e(l+1)} : 0 \le j \le n_{l+1}-1\} \quad \text{Eq. 39}$$

and $$f^{e \to s^p}(e_{(i_0)\ldots(i_q)\ldots(i_{l-1})(i_l)-(i_0)\ldots(i_q')\ldots(i_{l-1})(i_l)}^{(l)}) = \{s_{(i_0)\ldots(i_q - i_q')\ldots(i_{l-1})(i_l)(j-k)}^{p(l+1)} : 0 \le j \le n_{l+1}-1, 0 \le k \le n_{l+1}-1, j \ne k\} \quad \text{Eq. 40}$$

The definitions in Eq. 39 and Eq. 40 the index position q takes all possible values from the set [0, 1].

In one embodiment mappings between sets of vertices and products are defined. The inputs to a multiplication process of an embodiment are the polynomials a(x) b(x) of degree N−1:

$$a(x) = a_{N-1} \cdot x^{N-1} + a_{N-2} \cdot x^{N-2} + \ldots + a_1 \cdot x + a_0,$$

$$b(x) = b_{N-1} \cdot x^{N-1} + b_{N-2} \cdot x^{N-2} + \ldots + b_1 \cdot x + b_0 \quad \text{Eq. 41}$$

In one embodiment the coefficients of the polynomials a(x) and b(x) are real or complex numbers. In other embodiments the coefficients of the polynomials a(x) and b(x) are elements of a finite field.

The set V of m vertices are defined as:

$$V = \{v_{i_0}, v_{i_1}, \ldots, v_{i_{m-1}}\} \quad \text{Eq. 42}$$

The elements of V are described using the global index notation and their level is omitted for the sake of simplicity. Three mappings P(V), $P_1(V)$ and $P_2(V)$ are defined between the set V and products as follows:

$$P(V) = (a_{i_0} + a_{i_1} + \ldots + a_{i_{m-1}}) \cdot (b_{i_0} + b_{i_1} + \ldots + b_{i_{m-1}}) \quad \text{Eq. 43}$$

$$P_1(V) = \{a_{i_q} \cdot b_{i_q} : 0 \le q \le m-1\} \quad \text{Eq. 44}$$

$$P_2(V) = \{(a_i + a_j) \cdot (b_i + b_j) : i,j \in \{i_0, i_1, \ldots, i_{m-1}\}, i \ne j\} \quad \text{Eq. 45}$$

The product generation process accepts as input two polynomials of degree N−1 as shown in Eq. 41. The degree N of the polynomials can be factorized as shown in Eq. 1. The product generation process of an embodiment is the first stage of a two step process which generates a Karatsuba-like multiplication routine that computes c(x)=a(x) b(x). Since the polynomials a(x) and b(x) are of degree N−1, the polynomial c(x) must be of degree 2N−2. The polynomial c(x) is represented as:

$$c(x) = c_{2N-2} \cdot x^{2N-2} + c_{2N-3} \cdot x^{2N-3} + \ldots + c_1 \cdot x + c_0 \quad \text{Eq. 46}$$

Where $$c_i = \begin{cases} \sum_{j=0}^{i} a_j \cdot b_{i-j}, & \text{if } i \in [0, N-1] \\ \sum_{j=i-N+1}^{N-1} a_j \cdot b_{i-j} & \text{if } i \in [N, 2N-2] \end{cases} \quad \text{Eq. 47}$$

The expression in Eq. 47 can be also written as:

$$c_0 = a_0 \cdot b_0$$

$$c_1 = a_0 \cdot b_1 + a_1 \cdot b_0$$

$$\ldots$$

$$c_{N-1} = a_{N-1} \cdot b_0 + a_{N-2} \cdot b_1 + \ldots + a_0 \cdot b_{N-1}$$

$$c_N = a_{N-1} \cdot b_1 + a_{N-2} \cdot b_2 + \ldots + a_1 \cdot b_{N-1}$$

$$\ldots$$

$$c_{2N-2} = a_{N-1} \cdot b_{N-1} \quad \text{Eq. 48}$$

Our framework produces a multiplication process that computes all coefficients $c_0, c_1, \ldots, c_{2N-2}$. At the preprocessing stage, the product generation process generates all graphs $G_i^{(l)}$ for every level l, $0 \le l \le L-1$. The generation of products is realized by executing a product creation process of an embodiment, shown in pseudo code as CREATE_PRODUCTS:

```
CREATE_PRODUCTS( )
1.   P^a ← ∅
2.   for i ← 0 to |G^(L-1)|−1
3.     do P^a ← P^a ∪ P_1(V(G_i^(L-1)))
4.       P^a ← P^a ∪ P_2(V(G_i^(L-1)))
5.   GENERALIZED_EDGE_PROCESS( )
6.   return P^a
```

The process GENERALIZED_EDGE_PROCESS of an embodiment is described below in pseudo code.

```
GENERALIZED_EDGE_PROCESS( )
 1.   for l ← 0 to L−2
 2.     do for i ← 0 to |G^(l)|−1
 3.       do for j ← 0 to n_l−1
 4.         do for k ← 0 to n_l−1
 5.           do if j = k
 6.             then
 7.               continue
 8.             else
 9.               S_1 ← f^{e→s^e} (e_{i,j−i,k}^(l))
10.               S_2 ← f^{e→s^p} (e_{i,j−i,k}^(l))
11.               if l+1=L−1
12.                 then
13.                   for every s ∈ S_1∪S_2
14.                     do P^a ← P^a ∪ P(V(s))
15.                 else
16.                   for every s ∈ S_1
17.                     do SPANNING_EDGE_PROCESS(s)
18.                   for every s ∈ S_2
19.                     do SPANNING_PLANE_PROCESS(s)
20.   return
```

A shown above, the process GENERALIZED_EDGE_PROCESS( ) processes each generalized edge from the set $G^{(l)}$ one-by-one. If the level of a generalized edge is less than L−2, then the procedure GENERALIZED_EDGE_PROCESS( ) invokes two other processes for processing the spanning edges and spanning planes associated with the generalized edge. The first of the two, SPANNING_EDGE_PROCESS( ), is shown below in pseudo code:

```
SPANNING_EDGE_PROCESS(s)
 1.   l ← l(s)
 2.   S_1 ← f^{e→s^e} (s)
 3.   S_2 ← f^{e→s^p} (s)
 4.   if l+1= L−1
 5.     then
 6.       for every s' ∈ S_1 ∪ S_2
 7.         do P^a ← P^a ∪ P(V(s'))
 8.     else
 9.       for every s' ∈ S_1
10.         do SPANNING_EDGE_PROCESS(s')
11.       for every s' ∈ S_2
12.         do SPANNING_PLANE_PROCESS(s')
13.   return
```

The second process, SPANNING_PLANE_PROCESS( ), is shown below in pseudo code:

```
SPANNING_PLANE_PROCESS(s)
 1.   l ← l(s)
 2.   if l= L−1
 3.     then
 4.       P^a ← P^a ∪ P(V(s))
 5.     else
 6.       V̄ ← { V(s) }
 7.       while l < L−1
 8.         do V̄ ← EXPAND_VERTEX_SETS(V̄)
 9.           l ← l+1
10.       for every v' ∈ V̄
11.         do P^a ← P^a ∪ P(v')
12.   return
```

In one embodiment the process EXPAND_VERTEX_SETS( ) is shown below in pseudo code. The notation g(v) is used to refer to the global index of a vertex v.

```
EXPAND_VERTEX_SETS(V̄)
 1.   V_r ← ∅
 2.   for every V' ∈ V̄
 3.     do V_r ← V_r ∪ EXPAND_SINGLE_VERTEX_SET(V')
 4.   return V_r
EXPAND_SINGLE_VERTEX_SET(V )
 1.   V_r ← ∅
 2.   let v ∈ V
 3.   l ← l(v)
 4.   for p ← 0 to n_{l+1}−1
 5.     do for q ← 0 to n_{l+1}−1
 6.       do if p = q
 7.         then
 8.           continue
 9.         else
10.           U_{pq} ← ∅
11.           for i ← 0 to |V|−1
12.             do let v_i ← the i-th element of V
13.               g_i ← g(v_i)
14.               U_{pq} ← U_{pq} ∪ {v_{g_i,p}^{(l+1)}} ∪ {v_{g_i,p}^{(l+1)}}
15.           V_r ← V_r ∪ U_{pq}
16.   for q ← 0 to n_{l+1} −1
17.     do U_q ← ∅
18.     for i ← 0 to |V|−1
19.       do let v_i ← the i-th element of V
20.         g_i ← g(v_i)
21.         U_q ← U_q ∪ {v_{g_i,q}^{(l+1)}}
22.         V_r ← V_r ∪ U_q
23.   return V_r
```

In one embodiment for all simple graphs, the products associated with simple vertices and simple edges are determined and these products are added to the set $P^a$. This occurs in lines 3 and 4 of the process CREATE_PRODUCTS( ). Second, for all generalized edges at each level, one embodiment does the following: first, each generalized edge is decomposed into its associated spanning edges and spanning planes. This occurs in lines 9 and 10 of the process GENERALIZED_EDGE_PROCESS( ).

To find products associated with each spanning edge, it is determined if a spanning edge connects simple vertices. If it does, the process computes the product associated with the spanning edge from the global indexes of the endpoints of the edge. This occurs in line 14 of the process GENERALIZED_EDGE_PROCESS( ). If a spanning edge does not connect simple vertices, this spanning edge is further decomposed into its associated spanning edges and spanning planes. This occurs in lines 2 and 3 of the process SPANNING_EDGE_PROCESS( ). For each resulting spanning edge that is not at the last level the process SPANNING_EDGE_PROCESS( )is performed recursively. This occurs in line 10 of the process SPANNING_EDGE_PROCESS( ).

To find products associated with each spanning plane, it is determined if the vertices of a spanning plane are simple or not. If they are simple, the product associated with the global indexes of the plane's vertices is formed and it is added to the set $P^a$ (line 14 of the process GENERALIZED_EDGE_PROCESS( )). If the vertices of a plane are not simple, then the process expands these generalized vertices into graphs and creates sets of corresponding vertices and edge endpoints. This occurs in lines 14 and 21 of the process EXPAND_SINGLE_VERTEX_SET( ). For each such set the expansion is performed down to the last level. This occurs in lines 7-9 of the process SPANNING_PLANE_PROCESS( ).

There are four types of products created. The first type includes all products created from simple vertices. The set of such products $P_1^a$ is:

$$P_1^a = P(\{v_{(i_0)(i_1)\ldots(i_{L-2})(i_{L-1})}^{(L+1)}\}): i_j \in [0, n_j-1] \forall j \in [0, L-1]\} \quad \text{Eq. 49}$$

A second type of products includes those products formed by the endpoints of simple edges. The set of such products $P_2^a$ is:

$$P_2^a = P(\{v_{(i_0)(i_1)\ldots(i_{L-2})(i_{L-1})}^{(L+1)}, v_{(i_0)(i_1)\ldots(i_{L-2})(i'_{L-1})}^{(L+1)}\}): i_j \in [0, n_j-1] \forall j \in [0, L-1], i'_j \in [0, n_{L-1}-1], i_j \neq i'_j\} \quad \text{Eq. 50}$$

A third type of products includes all products formed by endpoints of spanning edges. These spanning edges result from recursive spanning edge decomposition down to the last level $L-1$. The set of such products $P_3^a$ has the following form:

$$P_3^a = \{P(\{v_{(i_0)(i_1)\ldots(i_q)\ldots(i_{L-1})}^{(L-1)}, v_{(i_0)(i_1)\ldots(i'_q)\ldots(i_{L-1})}^{(L-1)}\}): i_j \in [0, n_j-1] \forall j \in [0, L-1], i'_q \in [0, n_q-1], q \in [0, L-2], i_q \neq i'_q\} \quad \text{Eq. 51}$$

A fourth type of products includes those products formed from spanning planes after successive vertex set expansions have taken place. One can show by induction that this set of products $P_4^a$ has the following form:

$$P^a = \{P(\{v_{(i_0)\ldots(i_{q0})\ldots(i_{q1})\ldots(i_{qm-1})\ldots(i_{L-1})}^{(L-1)}, v_{(i_0)\ldots(i'_{q0})\ldots(i_{q1})\ldots(i_{qm-1})\ldots(i_{L-1})}^{(L-1)}, v_{(i_0)\ldots(i_{q0})\ldots(i'_{q1})\ldots(i_{qm-1})\ldots(i_{L-1})}^{(L-1)}, v_{(i_0)\ldots(i'_{q0})\ldots(i'_{q1})\ldots(i_{qm-1})\ldots(i_{L-1})}^{(L-1)}, \ldots, v_{(i_{q0})\ldots(i'_{q0})\ldots(i'_{q1})\ldots(i_{qm-1})\ldots(i_{L-1})}^{(L-1)}\}): i_j \in [0, n_j-1] \forall j \in [0, L-1], (i_{q_k} \in [0, n_{q_k}-1], i'_{q_k} \neq i_{q_k}) \forall k \in [0, m-1], 0 \leq q_0 \leq q_1 \leq \ldots \leq q_{m-1}, m \in [2, L]\} \quad \text{Eq. 52}$$

The set $P_4^a$ consists of all products formed from sets of vertices characterized by identical local indexes apart from those indexes at some index positions $q_0, q_1, \ldots, q_{m-1}$. For these index positions vertices take all possible different values from among the pairs of local indexes: $(i_{q0}, i_{q0}')$, $(i_{q1}, i_{q1}'), \ldots, (i_{q_{m-1}}, i_{q_{m-1}}')$. All possible $2^m$ local index sequences formed this way are included into the specification of the products of the set $P_4^a$. The number of index positions m for which vertices differ needs to be greater than, or equal to 2. The structure of the set $P_4^a$ is very similar to the structure of the set of all products generated by our process $$P^a = \bigcup_{i=1}^{4} P_i^a.$$

The set $P^a$ of all products generated by executing the process CREATE_PRODUCTS is given by the expression in Eq. 53 below.

The expression in Eq. 53 is identical to Eq. 52 with one exception: The number of index positions m for which vertices differ may also take the values 0 and 1. The set $P^a$ results from the union of $P_1^a$, $P_2^a$, $P_3^a$ and $P_4^a$. It can be seen that by adding the elements of $P_1^a$ into $P_4^a$ one covers the case for which m=0. By further adding the elements of $P_2^a$ and $P_3^a$ into $P_4^a$ also covers the case for which m=1.

$$P^a = \{P(\{v_{(i_0)\ldots(i_{q0})\ldots(i_{q1})\ldots(i_{qm-1})\ldots(i_{L-1})}^{(L-1)}, v_{(i_0)\ldots(i'_{q0})\ldots(i_{q1})\ldots(i_{qm-1})\ldots(i_{L-1})}^{(L-1)}, v_{(i_0)\ldots(i_{q0})\ldots(i'_{q1})\ldots(i_{qm-1})\ldots(i_{L-1})}^{(L-1)}, v_{(i_0)\ldots(i'_{q0})\ldots(i'_{q1})\ldots(i_{qm-1})\ldots(i_{L-1})}^{(L-1)}, \ldots, v_{(i_{q0})\ldots(i'_{q0})\ldots(i'_{q1})\ldots(i_{qm-1})\ldots(i_{L-1})}^{(L-1)}\}): i_j \in [0, n_j-1] \forall j \in [0, L-1], (i_{q_k} \in [0, n_{q_k}-1], i'_{q_k} \neq i_{q_k}) \forall k \in [0, m-1], 0 \leq q_0 \leq q_1 \leq \ldots \leq q_{m-1}, m \in [0, L]\} \quad \text{Eq. 53}$$

The expression in Eq. 53 is in a closed form that can be used for generating the products without performing spanning plane and spanning edge decomposition. In one embodiment all local index sequences defined in Eq. 53 are generated and form the products associated with these local index sequences. Spanning edges and spanning planes offer a graphical interpretation of the product generation process and can help with visualizing product generation for small operand sizes (e.g., N=9 or N=18).

The number of elements in the set $P^a$ generated by executing the process CREATE_PRODUCTS is equal to the number of scalar multiplications performed by generalized recursive Karatsuba for the same operand size N, and factors $n_0$, $n_1, \ldots, n_{L-1}$ such that $N = n_0 \cdot n_1 \cdot \ldots \cdot n_{L-1}$.

This is true because the number of scalar multiplications performed by generalized recursive Karatsuba as defined by Paar and Weimerskirch is:

$$|P^r| = \frac{n_0 \cdot (n_0 + 1)}{2} \cdot \frac{n_1 \cdot (n_1 + 1)}{2} \cdot \ldots \cdot \frac{n_{L-1} \cdot (n_{L-1} + 1)}{2} = \frac{\prod_{i=0}^{L-1} n_i \cdot (n_i + 1)}{2^L} \quad \text{Eq. 54}$$

In Eq. 49-52 the sets $P_1^a$, $P_2^a$, $P_3^a$ and $P_4^a$ do not contain any common elements. Therefore, the cardinality $|P^a|$ of the set $P^a$ is given by:

$$|P^a| = \sum_{i=1}^{4} |P_i^a| \quad \text{Eq. 55}$$

The set $P_1^a$ contains all products formed by sets which contain a single vertex only. Each single vertex is characterized by some arbitrary local index sequence. Hence the cardinality $|P_1^a|$ of the set $P_1^a$ is given by:

$$|P_1^a| = n_0 \cdot n_1 \cdot \ldots \cdot n_{L-1} = \prod_{i=0}^{L-1} n_i \quad \text{Eq. 56}$$

The set $P_2^a$ contains products formed by sets which contain two vertices. These vertices are characterized by identical local indexes for all index positions apart from the last one $L-1$. Since the number of all possible pairs of distinct values that can be considered from 0 to $n_{L-1}$ is $n_{L-1} \cdot (n_{L-1}-1)/2$, the cardinality of the set $P_2^a$ is equal to:

$$|P_2^a| = \frac{n_0 \cdot n_1 \cdot \ldots \cdot n_{L-1} \cdot (n_{L-1})}{2} = \left(\prod_{i=0}^{L-1} n_i\right) \cdot \frac{(n_{L-1}-1)}{2} \quad \text{Eq. 57}$$

The set $P_3^a$ contains products formed by sets which contain two vertices as well. The products of the set $P_3^a$ are formed differently from $P_2^a$, however. The vertices that form the products of $P_3^a$ are characterized by identical local indexes for all index positions apart from one position between 0 and $L-2$. Since the number of all possible pairs of local index values the can be considered for an index position j is $n_j \cdot (n_j-1)/2$, the cardinality of the set $P_3^a$ is equal to:

$$|P_3^a| = \frac{n_0 \cdot (n_0-1)}{2} \cdot n_1 \cdot n_2 \cdot \ldots \cdot n_{L-1} + \qquad \text{Eq. 58}$$
$$n_0 \cdot \frac{n_1 \cdot (n_1-1)}{2} \cdot n_2 \cdot \ldots \cdot n_{L-1} + \ldots +$$
$$n_0 \cdot n_1 \cdot n_2 \cdot \ldots \cdot \frac{n_{L-2} \cdot (n_{L-2}-1)}{2} \cdot n_{L-1} = \left(\prod_{i=0}^{L-1} n_i\right) \cdot \sum_{i=0}^{L-2} \frac{n_i-1}{2}$$

Finally, the set $P_4^a$ is characterized by the expression in Eq. 52. The cardinality of the set $P_4^a$ is equal to:

$$|P_4^a| = \frac{n_0 \cdot (n_0-1)}{2} \cdot \frac{n_1 \cdot (n_1-1)}{2} \cdot n_2 \cdot n_3 \cdot \ldots \cdot n_{L-1} + \qquad \text{Eq. 59}$$
$$n_0 \cdot \frac{n_1 \cdot (n_1-1)}{2} \cdot \frac{n_2 \cdot (n_2-1)}{2} \cdot n_3 \cdot \ldots \cdot n_{L-1} + \ldots +$$
$$n_0 \cdot n_1 \cdot \ldots \cdot \frac{n_{L-2} \cdot (n_{L-2}-1)}{2} \cdot \frac{n_{L-1} \cdot (n_{L-1}-1)}{2} +$$
$$\frac{n_0 \cdot (n_0-1)}{2} \cdot \frac{n_1 \cdot (n_1-1)}{2} \cdot \frac{n_2 \cdot (n_2-1)}{2} \cdot n_3 \cdot n_4 \cdot \ldots \cdot n_{L-1} +$$
$$\frac{n_0 \cdot (n_0-1)}{2} \cdot \frac{n_1 \cdot (n_1-1)}{2} \cdot n_2 \cdot \frac{n_3 \cdot (n_3-1)}{2} \cdot n_4 \cdot \ldots \cdot n_{L-1} +$$
$$\ldots + n_0 \cdot n_1 \cdot \ldots \cdot \frac{n_{L-3} \cdot (n_{L-3}-1)}{2} \cdot$$
$$\frac{n_{L-2} \cdot (n_{L-2}-1)}{2} \cdot \frac{n_{L-1} \cdot (n_{L-1}-1)}{2} + \ldots +$$
$$\frac{n_0 \cdot (n_0-1)}{2} \cdot \frac{n_1 \cdot (n_1-1)}{2} \cdot \ldots \cdot \frac{n_{L-1} \cdot (n_{L-1}-1)}{2}$$

Summing up the cardinalities of the sets $P_1^a$, $P_2^a$, $P_3^a$ and $P_4^a$:

$$|P^a| = \sum_{i=1}^{4} |P_i^a| = \frac{n_0 \cdot n_1 \cdot \ldots \cdot n_{L-1}}{2^L} \cdot [2^L + \qquad \text{Eq. 60}$$
$$2^{L-1} \cdot [(n_0-1)+(n_1-1)+\ldots+(n_{L-1}-1)]$$
$$2^{L-2} \cdot [(n_0-1) \cdot (n_1-1)+(n_0-1) \cdot (n_2-1)+$$
$$\ldots + (n_{L-2}-1) \cdot (n_{L-1}-1)] +$$
$$\ldots + (n_0-1) \cdot (n_1-1) \cdot \ldots \cdot (n_{L-1}-1)]$$

To prove that $|P^r|=P^a|$ the identity that follows is used:

$$(a_0+k) \cdot (a_1+k) \cdot \ldots \cdot (a_{m-1}+k) = k^m + k^{m-1} \cdot$$
$$(a_0+a_1+\ldots+a_{m-1}) + k^{m-2} \cdot (a_0 \cdot a_1 + a_0 \cdot a_2 + \ldots +$$
$$a_{m-2} \cdot a_{m-1}) + \ldots + a_0 \cdot a_1 \cdot \ldots \cdot a_{m-1} \qquad \text{Eq. 61}$$

By substituting $a_i$ with $(n_i-1)$, m with L, and k with 2 in Eq. 60 and by combining Eq. 60 and Eq. 61 results in Eq. 62:

$$|P^a| = \frac{n_0 \cdot n_1 \cdot \ldots \cdot n_{L-1}}{2^L} \cdot (n_0-1+2) \cdot \qquad \text{Eq. 62}$$
$$(n_1-1+2) \cdot \ldots \cdot (n_{L-1}-1+2)$$
$$= \frac{\prod_{i=0}^{L-1} n_i \cdot (n_i+1)}{2^L} = |P^r|$$

Therefore, it is proven that the number of products generated by an embodiment process is equal to the number of multiplication performed by using a generalized recursive Karatsuba process. It should be noted that the number of products generated by an embodiment process is substantially smaller than the number of scalar multiplication performed by the one-iteration Karatsuba solution of Paar and Weimerskirch (A. Weimerskirch and C. Paar, "Generalizations of the Karatsuba Algorithm for Efficient Implementations", *Technical Report*, University of Ruhr, Bochum, Germany, 2003), which is $N \cdot (N+1)/2$.

A typical product p from the set $P^a$ is $$p = P(\{v_{(i_0) \ldots (i_{q0}) \ldots (i_{q1}) \ldots (i_{qm-1}) \ldots (i_{L-1})}^{(L-1)},$$
$$v_{(i_0) \ldots (i_{q0'}) \ldots (i_{q1}) \ldots (i_{qm-1}) \ldots (i_{L-1})}^{(L-1)},$$
$$v_{(i_0) \ldots (i_{q0}) \ldots (i_{q1'}) \ldots (i_{qm-1}) \ldots (i_{L-1})}^{(L-1)},$$
$$v_{(i_0) \ldots (i_{q0}) \ldots (i_{q1}) \ldots (i_{qm-1'}) \ldots (i_{L-1})}^{(L-1)},$$
$$v_{(i_0) \ldots (i_{q0'}) \ldots (i_{q1'}) \ldots (i_{qm-1'}) \ldots (i_{L-1})}^{(L-1)}\}) : i_j \in [0, n_j-1] \forall j \in [0,L-1], (i_{q_k} \in [0, n_{q_k}-1] \; i_{q_k} \neq i_{q_k}') \forall k \in [0, m-1], 0 \leq q_0 \leq q_1 \leq \ldots \leq q_{m-1}, m \in [0,L] \qquad \text{Eq. 63}$$

For the product p, a 'surface' in the m-k dimensions ($0 \leq k \leq m$) associated with 'free' index positions $q_{f_0}, q_{f_1}, \ldots, q_{f_{m-k-1}}$, 'occupied' index positions $q_{p_0}, q_{p_1}, \ldots, q_{p_{k-1}}$, and indexes for the occupied positions $\hat{i}_{q_{p_0}}, \hat{i}_{q_{p_1}}, \ldots, \hat{i}_{q_{p_{k-1}}}$ is defined as the product that derives from p by setting the local indexes of all vertices of p to be equal to $\hat{i}_{q_{p_0}}, \hat{i}_{q_{p_1}}, \ldots, \hat{i}_{q_{p_{k-1}}}$ at the occupied index positions, and by allowing the indexes at the free positions to take any value between $i_{q_{f_0}}$ and $i_{q_{f_0}}'$, $i_{q_{f_1}}$ and $i_{q_{f_1}}'$, ..., and $i_{q_{f_{m-k-1}}}$ and $i_{q_{f_{m-k-1}}}'$.

The sets of the free and occupied index positions satisfy the following conditions:

$$\{q_{f_0}, q_{f_1}, \ldots, q_{f_{m-k-1}}\} \subset \{q_0, q_1, q_{m-1}\},$$
$$\{q_{p_0}, q_{p_1}, \ldots, q_{p_{k-1}}\} \subset \{q_0, q_1, q_{m-1}\},$$
$$\{q_{f_0}, q_{f_1}, \ldots, q_{f_{m-k-1}}\} \cap \{q_{p_0}, q_{p_1}, q_{p_{k-1}}\} = \emptyset$$
$$\{q_{f_0}, q_{f_1}, \ldots, q_{f_{m-k-1}}\} \cup \{q_{p_0}, q_{p_1}, q_{p_{k-1}}\} = \{q_0, q_1, q_{m-1}\} \qquad \text{Eq. 64}$$

In addition the indexes for the occupied positions $$\hat{i}_{q_{p_0}}, \hat{i}_{q_{p_1}}, \ldots, \hat{i}_{q_{p_{k-1}}}$$

satisfy:

$$\hat{i}_{q_{p_0}} \in \{i_{q_{p_0}}, i_{q_{p_0}}'\}, \hat{i}_{q_{p_1}} \in \{i_{q_{p_1}}, i_{q_{p_1}}'\}, \ldots, \hat{i}_{q_{p_{k-1}}} \in \{i_{q_{p_{k-1}}}, i_{q_{p_{k-1}}}'\} \qquad \text{Eq. 65}$$

Such surface is denoted as $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}.$$

The formal definition of a surface $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}$$

is given in Eq. 66 below.

From the definition of Eq. 66 is it evident that a surface $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}$$

associated with a product p is also an element of the set $P^a$ and is generated by the procedure CREATE_PRODUCTS. From the definition in Eq. 66 is it is also evident that whereas p is formed by a set of $2^m$ vertices, the surface $$u_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{p_{k-1}}}}$$

is formed by a set of $2^{m-k}$ vertices. Finally, from the definition of the mapping in Eq. 43 and Eq. 66 it is evident that $$u_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{p_{k-1}}}} < p.$$

$$u_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{p_{k-1}}}} = \quad \text{Eq. 66}$$

$$p\left(\left\{\begin{array}{l} v_{(i_0)\ldots(\hat{i}_{q_{p_0}})\ldots(i_{q_{f_0}})\ldots(i_{q_{f_1}})\ldots(i_{q_{f_{m-k-1}}})\ldots(\hat{i}_{q_{p_{k-1}}})\ldots(i_{L-1})}^{(L-1)}, \\ v_{(i_0)\ldots(\hat{i}_{q_{p_0}})\ldots(i'_{q_{f_0}})\ldots(i_{q_{f_1}})\ldots(i_{q_{f_{m-k-1}}})\ldots(\hat{i}_{q_{p_{k-1}}})\ldots(i_{L-1})}^{(L-1)}, \\ v_{(i_0)\ldots(\hat{i}_{q_{p_0}})\ldots(i'_{q_{f_0}})\ldots(i'_{q_{f_1}})\ldots(i_{q_{f_{m-k-1}}})\ldots(\hat{i}_{q_{p_{k-1}}})\ldots(i_{L-1})}^{(L-1)}, \\ \ldots, \\ v_{(i_0)\ldots(\hat{i}_{q_{p_0}})\ldots(i'_{q_{f_0}})\ldots(i'_{q_{f_1}})\ldots(i'_{q_{f_{m-k-1}}})\ldots(\hat{i}_{q_{p_{k-1}}})\ldots(i_{L-1})}^{(L-1)} \end{array}\right\}\right):$$

$$\{i_{q_{f_0}}, i_{q_{f_1}}, \ldots, i_{q_{f_{m-k-1}}}\} \in \{i_{q_0}, i_{q_1}, \ldots, i_{q_{m-1}}\},$$

$$\{i'_{q_{f_0}}, i'_{q_{f_1}}, \ldots, i'_{q_{f_{m-k-1}}}\} \in \{i'_{q_0}, i'_{q_1}, \ldots, i'_{q_{m-1}}\}$$

and conditions (65) and (66) hold}

The set of all surfaces in the m−k dimensions associated with a product p, free index positions $q_{f_0}, q_{f_1}, \ldots, q_{f_{m-k-1}}$ and occupied index positions $q_{p_0}, q_{p_1}, \ldots, q_{p_{k-1}}$ are defined as the union:

$$U_{q_{f_0},q_{f_1},\ldots,q_{f_{m-k-1}};q_{p_0},q_{p_1},\ldots,q_{p_{k-1}}}^{p;m-k} = \quad \text{Eq. 67}$$

$$\bigcup_{\hat{i}_{q_{p_0}},\hat{i}_{q_{p_1}},\ldots,\hat{i}_{q_{pk-1}}} U_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{pk-1}}}$$

Next, the set of all surfaces in the m−k dimensions associated with a product p are defined as the union:

$$U^{p;m-k} = \bigcup_{\substack{q_{f_0},q_{f_1},\ldots,q_{f_{m-k-1}}, \\ q_{p_0},q_{p_1},\ldots,q_{p_{k-1}}}} U_{q_{f_0},q_{f_1},\ldots,q_{f_{m-k-1}};q_{p_0},q_{p_1},\ldots,q_{p_{k-1}}}^{p;m-k} \quad \text{Eq. 68}$$

A 'parent' surface $\wp(u)$ of a particular surface $$u = u_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{p_{k-1}}}}$$

is defined as the surface associated with the product p, occupied index positions $q_{p_0}, q_{p_1}, \ldots, q_{p_{k-2}}$, free index positions $q_{f_0}, q_{f_1}, \ldots, q_{f_{m-k-1}}, q_{p_{k-1}}$, and indexes at the occupied positions $\hat{i}_{q_{p_0}}, \hat{i}_{q_{p_1}}, \ldots, \hat{i}_{q_{p_{k-2}}}$:

$$\wp(u) = u_{q_{f_0},q_{f_1},\ldots,q_{f_{m-k-1}},q_{p_{k-1}};q_{p_0},q_{p_1},\ldots,q_{p_{k-2}}}^{p;m-k+1;\hat{i}_{q_{p_0}},\hat{i}_{q_{p_1}},\ldots,\hat{i}_{q_{p_{k-2}}}} \quad \text{Eq. 69}$$

The set of 'children' of a surface $u \in U^{p; m-k}$ is defined as the set:

$$l(u) = \{v : v \in U^{p; m-k-1}, u = \wp(v)\} \quad \text{Eq. 70}$$

In one embodiment, a process that generates subtraction formulae uses a matrix M which size is equal to the cardinality of $P^a$, i.e., the number of all products generated by the procedure CREATE_PRODUCTS( ). The cardinality of $P^a$ is also equal to the number of unique surfaces that can be defined in all possible dimensions for all products of $P^a$. This is because each surface of a product is also a product by itself. For each possible product p, or surface u, the matrix M is initialized as M[p]←p, or equivalently M[u]←u. Initialization takes place every time a set of subtractions is generated for a product p of $P^a$.

Subtractions are generated by a generate subtractions process GENERATE_SUBTRACTIONS( ), which pseudo code is listed below. The subtraction formulae which are generated by generate subtractions process GENERATE_SUBTRACTIONS( ) are returned in the set $S^a$.

```
1. GENERATE_SUBTRACTIONS( )
2. S^a ← ∅
3. for every p ∈ P^a
4.    do INIT_M( )
5.       GENERATE_SUBTRACTIONS_FOR_PRODUCT(p)
6. return S^a
```

The procedure INIT_M( ) is listed below:

```
INIT_M( )
1. for every p ∈ P^a
2.    do M[p] ← p
3. return
```

A process GENERATE_SUBTRACTIONS_FOR_PRODUCT( ), that is also invoked by GENERATE_SUBTRACTIONS( ), is listed below in pseudo code:

```
GENERATE_SUBTRACTIONS_FOR_PRODUCT(p)
1. m ← the number free index positions in p
2. for l ← 0 to m−1
3.    for every u_i ∈ U^{p;l}
4.
5.       do s ← (M[𝒫(u_i)] ← M[𝒫(u_i)] − M[u_i])
6.       if s ∉ S^a
7.       then
```

-continued

8.　　　$S^a \leftarrow S^a \cup s$
9. return

For each product p of $P^a$ the subtractions generated by a process GENERATE_SUBTRACTIONS( ) reduce its value. Let $\mu(p)$ the final value of the table entry M[p] after the procedure GENERATE_SUBTRACTIONS_FOR_PRODUCT( ) is executed for the product p. It can be seen that $\mu(p)$ is in fact the product p minus all surfaces of p defined in the m−1 dimensions, plus all surfaces of p defined in the m−2 dimensions, . . . , minus (plus) all surfaces of p defined in 0 dimensions (i.e., products of single vertices). By m it is meant that the number of free index positions of p.

Next, it is determined how the subtractions generated by the process GENERATE_SUBTRACTIONS( ) can be interpreted graphically. Consider an example of an 18 by 18 multiplication. One of the products generated by the procedure CREATE_PRODUCTS( ) is formed from the set of vertices with global indexes 0, 1, 6, 7, 9, 10, 15, 16. This is the product $(a_0+a_1+a_6+a_7+a_9+a_{10}+a_{15}+a_{16})\square(b_0+b_1+b_6+b_7+b_9+b_{10}+b_{15}+b_{16})$.

Figure 10:
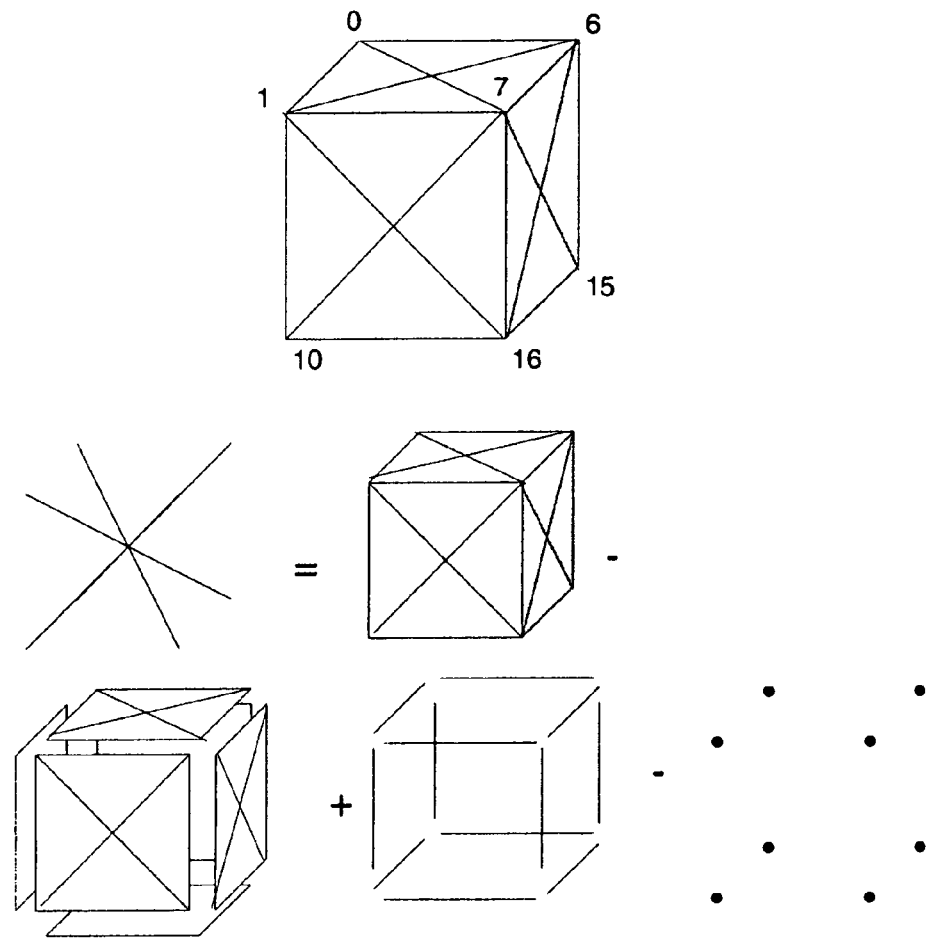
FIG. 10 illustrates a graphical representation of subtraction generation of an embodiment.

Consider the complete graph which is formed from the vertices of this product. This graph has the shape of a cube but it also contains the diagonals that connect every other vertex, as shown in FIG. 10. The product has 6 associated surfaces defined in 2 dimensions, 12 surfaces defined in 1 dimension and 8 surfaces defined in 0 dimensions. The surfaces defined in 2 dimensions are the products $(a_0+a_1+a_6+a_7)\cdot(b_0+b_1+b_6+b_7)$, $(a_0+a_1+a_9+a_{10})\cdot(b_0+b_1+b_9+b_{10})$, $(a_6+a_7+a_{15}+a_{16})\cdot(b_6+b_7+b_{15}+b_{16})$, $(a_9+a_{10}+a_{15}+a_{16})\cdot(b_9+b_{10}+b_{15}+b_{16})$, $(a_1+a_7+a_{10}+a_{16})\cdot(b_1+b_7+b_{10}+b_6)$, and $(a_0+a_6+a_9+a_{15})\cdot(b_0+b_6+b_9+b_{15})$. These products are formed from sets of 4 vertices. The complete graphs of these sets form squares which together with their diagonals cover the cube associated with the product $(a_0+a_1+a_6+a_7+a_9+a_{10}+a_{15}+a_{16})\cdot(b_0+b_1+b_6+b_7+b_9+b_{10}+b_{15}+b_{16})$. This is the reason why the term 'surfaces' is used to refer to such products.

The surfaces defined in a single dimension are the products $(a_0+a_1)\cdot(b_0+b_1)$, $(a_0+a_6)\cdot(b_0+b_6)$, $(a_{1+a7})\cdot(b_1+b_7)$, $(a_6+a_7)\cdot(b_6+b_7)$, $(a_9+a_{10})\cdot(b_9+b_{10})$, $(a_9+a_{15})\cdot(b_9+b_{15})$, $(a_{10}+a_{16})\cdot(b_{10}+b_{16})$, $(a_{15}+a_{16})\cdot(b_{15}+b_{16})$, $(a_1+a_{10})(b_1+b_{10})$, $(a_0+a_9)\cdot(b_0+b_9)$, $(a_7+a_{16})\cdot(b_7+b_{16})$, and $(a_6+a_{15})(b_6+b_{15})$. These products are formed from sets of 2 vertices. The complete graphs of these sets form the edges of the cube associated with the product $(a_0+a_1+a_6+a_7+a_9+a_{10}+a_{15}+a_{16})\cdot(b_0+b_1+b_6+b_7+b_9+b_{10}+b_{15}+b_{16})$. Finally, the surfaces defined in 0 dimensions are products formed from single vertices. These are the products $a_0\cdot b_0$, $a_1\cdot b_1$, $a_6\cdot b_6$, $a_7\cdot b_7$, $a_9\cdot b_9$, $a_{10}\cdot b_{10}$, $a_{15}\cdot b_{15}$, and $a_{16}\cdot b_{16}$.

Next, it is determined what remains if from the product $(a_0+a_1+a_6+a_7+a_9+a_{10}+a_{15}+a_{16})\cdot(b_0+b_1+b_6+b_7+b_9+b_{10}+b_{15}+b_{16})$ are subtracted all the surfaces defined in 2 dimensions, added all surfaces defined in 1 dimension and subtracted all surfaces defined in 0 dimensions. It can be seen that what remains is the term $a_0\cdot b_{16}+a_{16}\cdot b_0+a_1\cdot b_{15}+a_{15}\cdot b_1+a_6\cdot b_{10}+a_{10}\cdot b_6+a_9\cdot b_7+a_7\cdot b_9$. This term is part of the coefficient $c_{16}$ of the output. The derivation of this term can be interpreted graphically as the subtraction of all covering squares from a cube, the addition of its edges and the subtraction of its vertices. What remains from these subtractions are the diagonals of the cube, excluding their end-points.

To prove the correctness of the embodiments, it is shown that every term $\mu(p)$ produced by the subtractions of the process GENERATE_SUBTRACTIONS( ) is part of one coefficient of a Karatsuba output c(x). It is also shown that for two different products p, $\tilde{p} \in P^a$, the terms $\mu(p)$ and $\mu(\tilde{p})$ do not include common terms of the form $a_{i_1}\cdot b_{i_2}+a_{i_2}\cdot b_{i_1}$. Also, it is shown that each term of the form $a_{I_1}\cdot b_{I_2}+a_{I_2}\cdot b_{I_1}$ of every coefficient of the Karatsuba output c(x) is part of some term $\mu(p)$ resulting from a product $p \in P^a$.

Consider a product $p \in P^a$ defined by Eq. 63. If m>0, then $\mu(p)$ is the sum of all possible terms of the form $a_{I_1}\cdot b_{I_2}+a_{I_2}\cdot b_{I_1}$ that satisfy the following conditions:

$$I_1 = i_0 \cdot n_1 \cdot \ldots \cdot n_{L-1} + \ldots + i_{q_0} \cdot n_{q_0+1} \cdot \ldots \cdot n_{l-1} + \ldots + \hat{i}_{q_{m-1}} \cdot n_{q_{m-1}+1} \cdot \ldots \cdot n_{l-1} + \ldots + i_{L-1},$$

$$I_2 = i_0 \cdot n_1 \cdot \ldots \cdot n_{L-1} + \ldots + \hat{i}_{q_0} \cdot n_{q_0+1} \cdot \ldots \cdot n_{l-1} + \ldots + i_{q_{m-1}} \cdot n_{q_{m-1}+1} \cdot \ldots \cdot n_{l-1} + \ldots + i_{L-1},$$

$$\hat{i}_{q_0}, i_{q_0} \in \{i_{q_0}, i_{q_0}'\}, \hat{i}_{q_0} \neq i_{q_0} \cdots \hat{i}_{q_{m-1}} \in \{i_{q_{m-1}}, i_{q_{m-1}}'\}, \hat{i}_{q_{m-1}} \neq i_{q_{m-1}}$$

Eq. 71

This means that $\mu(p)$ is the sum of all terms of the form $a_{I_1}\cdot b_{I_2}+a_{I_2}\cdot b_{I_1}$ such that the global index $I_1$ in each term $a_{I_1}\cdot b_{I_2}+a_{I_2}\cdot b_{I_1}$ is created by selecting some local index values $\hat{i}_{q_0}, \ldots$ $\hat{i}_{q_{m-1}}$ from among $\{i_{q_0}, i_{q_0}'\}, \ldots, \{i_{q_{m-1}}, i_{q_{m-1}}'\}$, whereas the global index $I_2$ in the same term is created by selecting those local index values not used by $I_1$.

From Eq. 63 it is evident that the product p is the sum of terms which are either of the form $a_{I_1}\cdot b_{I_2}+a_{I_2}\cdot b_{I_1}$ or $a_{I_1}\cdot b_{I_1}$. The term $\mu(p)$ is derived from p by sequentially subtracting and adding surfaces of m−1, m−2, . . . , 0 dimensions. These surfaces are also sums of terms of the forms $a_{I_1}\cdot b_{I_2}+a_{I_2}\cdot b_{I_1}$ or $a_{I_1}\cdot b_{I_1}$ (from Eq. 66). In addition every term of the forms $a_{I_1}\cdot b_{I_2}+a_{I_2}\cdot b_{I_1}$ or $a_{I_1}\cdot b_{I_1}$ of every surface of p is included in p.

Next, it is shown that $\mu(p)$ does not contain terms of the form $a_{I_1}\cdot b_{I_1}$ and that the terms of the form $a_{I_1}\cdot b_{I_2}+a_{I_2}\cdot b_{I_1}$ satisfy Eq. 71. Assume for the moment that there exist a term $a_{I_1}\cdot b_{I_2}+a_{I_2}\cdot b_{I_1}$ in $\mu(p)$ that does not satisfy Eq. 71. For this term, there exists a subset of local index positions $\{q_{e_0}, q_{e_1}, \ldots, q_{e_{L-1}}\} \in \{q_0, q_1, \ldots, q_{m-1}\}$ for which the global indexes $I_1$ and $I_2$ are associated with the same local index values. Because of this reason this term is part of $$\binom{l}{l}$$

surfaces of m dimensions, $$\binom{l}{l-1}$$

surfaces of m−1 dimensions, $$\binom{l}{l-2}$$

surfaces of m−2 dimensions, . . . , and $$\binom{l}{0}$$

surfaces of m-1 dimensions. From the manner in which the mapping P(V) is defined, it evident that the term $a_{I_1} \cdot b_{I_2} + a_{I_2} \cdot b_{I_1}$ appears only once in each of these surfaces. Therefore the total number of times $N_L$ this term appears in $\mu(p)$ is given by:

$$N_L = \left| \binom{l}{l} - \binom{l}{l-1} + \binom{l}{l-2} - \ldots + (-1)^l \cdot \binom{l}{1} - (-1)^l \cdot \binom{l}{0} \right| \quad \text{Eq. 72}$$

Using Newton's binomial formula:

$$(x+a)^n = \quad \text{Eq. 73}$$
$$a^n + \binom{n}{1} \cdot a^{n-1} \cdot x + \binom{n}{2} \cdot a^{n-2} \cdot x^2 + \ldots + \binom{n}{1} \cdot a \cdot x^{n-1} + x^n$$

Substituting x with 1, a with −1 and n with l we get that $N_L = 0$. Hence $\mu(p)$ does not contain any terms of the form $a_{I_1} \cdot b_{I_2} + a_{I_2} \cdot b_{I_1}$ that do not satisfy Eq. 72. What remains is to show that $\mu(p)$ does not contain terms of the form $a_{I_1} \cdot b_{I_1}$. Every term of the form $a_{I_1} \cdot b_{I_1}$ is part of $$\binom{m}{m}$$

surfaces of m dimensions, $$\binom{m}{m-1}$$

surfaces of m−1 dimensions, $$\binom{m}{m-2}$$

surfaces of m−2 dimensions, . . . , and $$\binom{m}{0}$$

surfaces of 0 dimensions. Therefore, the total number of times a term $a_{I_1} \cdot b_{I_1}$ appears in $\mu(p)$ is zero (from Newton's binomial formula).

The term $\mu(p)$ contains all possible terms of the form $a_{I_1} \cdot b_{I_2} + a_{I_2} \cdot b_{I_1}$ that satisfy Eq. 71. This is because these terms are part of p and they are not included into any surface of p. Therefore, these terms are not subtracted out when $\mu(p)$ is derived.

Consider a product $p \in P^a$ defined by Eq. 63. The sum of terms $\mu(p)$ is part of the coefficient $c_{i_c}$ of the Karatsuba output where the index $i_c$ is given by Eq. 74.

First consider the case where m>0. In this case, $\mu(p)$ is a sum of terms of the form $a_{I_1} \cdot b_{I_2} + a_{I_2} \cdot b_{I_1}$ that satisfy Eq. 71. In this case $I_1 + I_2 = i_c$ for every term $a_{I_1} \cdot b_{I_2} + a_{I_2} \cdot b_{I_1}$. In the second case where m=0, the product p is formed from a single vertex. Therefore, $p = \mu(p) = a_{I_1} \cdot b_{I_1}$ for some global index $I_1$. In this case, $2 \cdot I_1 = i_c$.

$$i_c = \quad \text{Eq. 74}$$
$$2 \cdot i_0 \cdot n_1 \cdot n_2 \cdot \ldots \cdot n_{L-1} + \ldots + (i_{q_0} + i'_{q_0}) \cdot n_{q_0+1} \cdot n_{q_0+2} \cdot \ldots \cdot n_{L-1} +$$
$$\ldots + (i_{q_1} + i'_{q_1}) \cdot n_{q_1+1} \cdot n_{q_1+2} \cdot \ldots \cdot n_{L-1} + \ldots +$$
$$(i_{q_{m-1}} + i'_{q_{m-1}}) \cdot n_{q_{m-1}+1} \cdot n_{q_{m-1}+2} \cdot \ldots \cdot n_{L-1} + \ldots + 2 \cdot i_{L-1}$$

Next we show that the terms $\mu(p)$ and $\mu(\tilde{p})$ that derive from two different products p, $\tilde{p} \in P^a$ do not include any common terms.

Consider the products p, $\tilde{p} \in P^a$. The terms $\mu(p)$ and $\mu(\tilde{p})$ that derive from these products have no terms of the form $a_{I_1} \cdot b_{I_2} + a_{I_2} \cdot b_{I_1}$ or $a_{I_1} \cdot b_{I_1}$ in common.

In the trivial case where the number of free index positions of both p and $\tilde{p}$ is zero, $p = \mu(p)$, $\tilde{p} = \mu(\tilde{p})$ and $p \neq \tilde{p}$. In the case where one of the two products is characterized by zero free index positions and the other is not, then it is not possible for $\mu(p)$, $\mu(\tilde{p})$ to contain common terms since one of the two is equal to $a_{I_1} \cdot b_{I_1}$ for some global index $I_1$ and the other is the sum of terms $a_{I_1} \cdot b_{I_2} + a_{I_2} \cdot b_{I_1}$ that satisfy Eq. 72.

Now, assume that both p and $\tilde{p}$ are characterized by at least one free index position and that there exist two terms $a_{I_1} \cdot b_{I_2} + a_{I_2} \cdot b_{I_1}$ and $a_{\tilde{I}_1} \cdot b_{\tilde{I}_2} + a_{\tilde{I}_2} \cdot b_{\tilde{I}_1}$ from $\mu(p)$ and $\mu(\tilde{p})$ respectively that are equal. Equality of global indexes means equality of their associated sequences of local indexes. The local index positions for which $I_1$ and $I_2$ (or $\tilde{I}_1$ and $\tilde{I}_2$) differ are free index positions for both p and $\tilde{p}$. On the other hand, all other local index positions must be occupied. Indeed, if any of these index positions was free, then the local index sequences associated with $I_1$ and $I_2$ would differ at that position, but they do not. Therefore, the products p and $\tilde{p}$ are defined using the same free and occupied local index positions. Now, from the equality of the local index sequences of $I_1$ and $I_2$ it is evident that p and $\tilde{p}$ specify the same pairs of local index values at their free index positions and the same single values at their occupied positions. Therefore, p and $\tilde{p}$ are equal, which contradicts the assumption.

Every term of the form $a_{I_1} \cdot b_{I_2} + a_{I_2} \cdot b_{I_1}$ of a coefficient of the Karatsuba output is part of a term $\mu(p)$ for some product $p \in P^a$. The global indexes $I_1$ and $I_2$ can be converted into 2 local index sequences. These sequences will be identical for some local index positions and different for others. A product p can be completely defined in this case from $I_1$ and $I_2$ by specifying the local index positions for which $I_1$ and $I_2$ differ as free and all others as occupied. The pairs of local index values for which $I_1$ and $I_2$ differ are specified at the free index positions of all vertices of the product p, whereas the local index values which are in common between $I_1$ and $I_2$ are specified at the occupied positions. From the manner in which the product p is specified it is evident that $\mu(p)$ contains the term $a_{I_1} \cdot b_{I_2} + a_{I_2} \cdot b_{I_1}$.

Figure 11A:
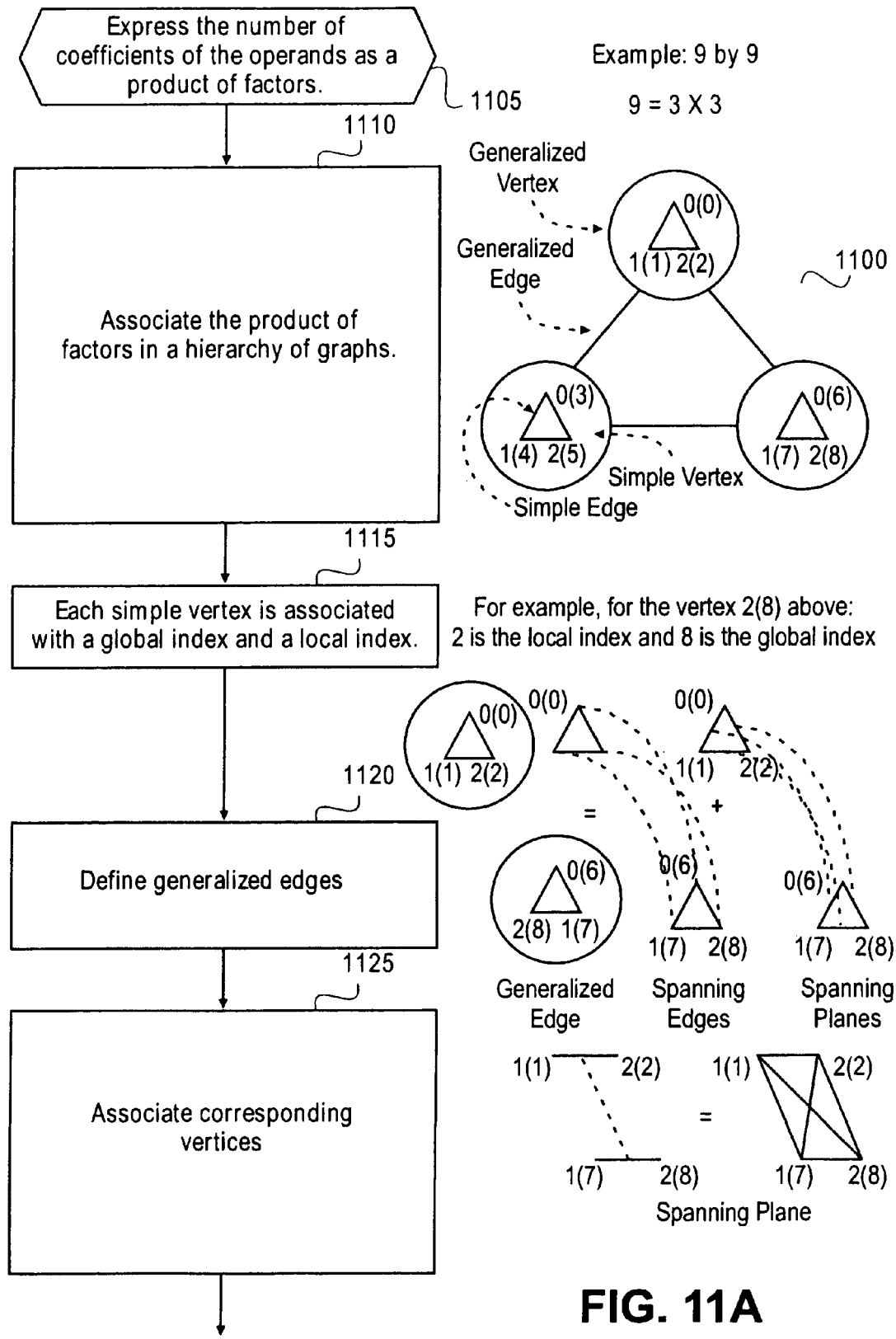
FIG. 11A-B illustrate a block diagram of an embodiment.
Figure 11B:
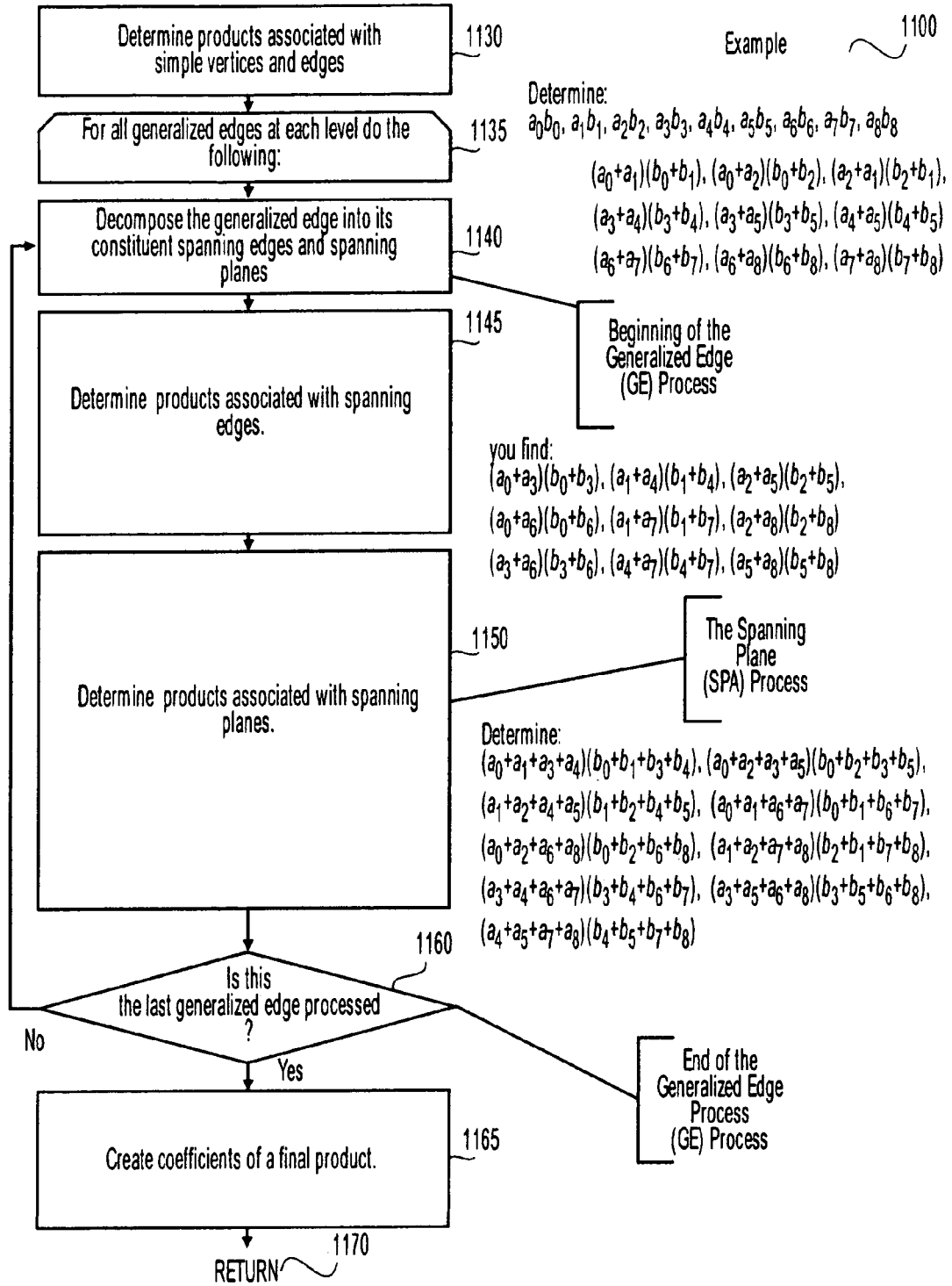

In what follows we refer to the example of FIG. 11B. We describe the steps by which a single iteration multiplication is performed between two polynomials of degree 8. Additions connect the "a" terms and the "b" terms 6, 7 and 8 in order to form the nodes of the triangle 6-7-8. Additions connect the "a" terms and the "b" terms 3, 4 and 5 to form the triangle 3-4-5. Additions connect the "a" terms and the "b" terms 0, 1 and 2 to form the triangle 0-1-2. Additions connect 1-by-1 the "a" and "b" terms 6-7-8 and 3-4-5. Additions connect 1-by-1 the "a" and "b" terms 6-7-8 and 0-1-2. Additions connect 1-by-1 the "a" and "b" terms 3-4-5 and 0-1-2. Additions create the spanning planes associated the edges of the triangles 6-7-8 and 3-4-5. Additions create the spanning planes associated with the edges of the triangles 6-7-8 and 0-1-2. Additions create the spanning planes associated with the edges of the edges of the triangles 3-4-5 and 0-1-2.

Multiplications create the nodes of the triangles 0-1-2, 3-4-5, and 6-7-8. Multiplications create the edges of the triangle 6-7-8. Multiplications create the edges of the triangle 3-4-5. Multiplications create the edges of the triangle 0-1-2. Multiplications create the edges that connect the nodes of the triangles 6-7-8 and 3-4-5. Multiplications create the edges that connect the nodes of the triangles 6-7-8 and 0-1-2. Multiplications create the edges that connect the nodes of the triangles 3-4-5 and 0-1-2. Multiplications create the spanning planes that connect the edges of the triangles 6-7-8 and 3-4-5. Multiplications create the spanning planes that connect the edges of the triangles 6-7-8 and 0-1-2. Multiplications create the spanning planes that connect the edges of the triangles 3-4-5 and 0-1-2.

Subtractions are performed, associated with the edges of the triangle 6-7-8. Subtractions are performed, associated with the edges of the triangle 3-4-5. Subtractions are performed, associated with the edges of the triangle 0-1-2. Subtractions are performed, associated with the edges that connect the nodes of the triangles 6-7-8 and 3-4-5. Subtractions are performed, associated with the edges that connect the nodes of the triangles 6-7-8 and 0-1-2. Subtractions are performed, associated with the edges that connect the nodes of the triangles 3-4-5 and 0-1-2. Subtractions are performed, associated with the spanning planes that connect the edges of the triangles 6-7-8 and 3-4-5. Subtractions are performed, associated with the spanning planes that connect the edges of the triangles 6-7-8 and 0-1-2. Finally, subtractions are performed, associated with the spanning planes that connect the edges of the triangles 3-4-5 and 0-1-2.

Additions create the coefficients of the resulting polynomial. Next the polynomial is converted to a big number.

FIG. 11A-B illustrates a block diagram and graphical illustration of process of an embodiment. Process 1100 starts with block 1105 where the number of coefficients of operands are expressed as a product of factors. It should be noted that the graphical illustration is an example for a 9×9 operation. In block 1110, each of the factors is associated with a level in a hierarchy of interconnected graphs. At each level of the hierarchy, a fully connected graph (i.e., generalized graphs having generalized vertices and generalized edges) has as many vertices as the factor associated with the level. At the last level of the hierarchy there exist simple graphs with simple interconnected vertices and simple edges.

In block 1115, each simple vertex is associated with a global index and a last level local index. In block 1120, generalized edges are defined consisting of a number of spanning edges and spanning planes. In block 1125, a spanning edge is an edge between two corresponding generalized (or simple) vertices. Corresponding vertices are associated with the same last level local index but different global indexes. A spanning plane is a fully connected graph interconnecting four generalized (or simple) vertices.

In block 1130, for all graphs interconnecting simple vertices, the products associated with simple vertices and simple edges are determined. Block 1135 starts a loop between blocks 1140, 1145, 1150 and 1160, where each block is performed for all generalized edges at each level.

In block 1140, a generalized edge is decomposed into its constituent spanning edges and spanning planes. In block 1145, the products associated with spanning edges are determined. If a spanning edge connects simple vertices, the product associated with the edge from the global indexes of the edge's adjacent vertices is formed. Otherwise the products associated with spanning edges are determined by treating each spanning edge as a generalized edge and applying a generalized edge process (blocks 1140 and 1145) recursively.

In block 1150, to determine products associated with spanning planes, process 1100 examines if the vertices of the plane are simple or not. If they are simple, the product associated with the global indexes of the planes vertices is formed and returned. If the vertices are not simple, the generalized vertices are expanded into graphs and sets of corresponding vertices and edges are created. Corresponding edges are edges interconnecting vertices with the same last level local index but different global index. For each set, the vertices which are elements of the set are used for running the spanning plane process (block 1150) recursively.

In block 1160, it is determined whether the last generalized edge has been processed by blocks 1140, 1145 and 1150. If the last edge has not been processed, process 1100 returns to block 1140. If the last edge has been processed, process 1100 continues with block 1165. In block 1165, for all the graphs associated with products created, (i.e., edges, squares, cubes, hyper-cubes, etc.) the periphery is subtracted and the diagonals are used to create coefficients of a final product. Process 1100 then proceeds with returning the final product at 1170.

Next a comparison of four one-iteration multiplication techniques: the Montgomery approach to Karatsuba (P. Montgomery, "Five, Six and Seven-Term Karatsuba-like Formulae", *IEEE Transactions on Computers*, March 2005), the Paar and Weimerskirch approach, an embodiment and the schoolbook way. These techniques are compared in terms of the number of scalar multiplications each technique requires for representative operand sizes. From the numbers shown in FIG. 12 it is evident that an embodiment process outperforms all alternatives which are widely applicable to many different operand sizes. For some of the odd input sizes embodiments generate formulae for the input size minus 1 (which is even) and then use the Paar and Weimerskirch technique to generate products and subtractions for the additional input term.

Big number multiplication is used by popular cryptographic algorithms like Rivest, Shamir, & Adleman (RSA). The embodiment processes avoid the cost of recursion. The embodiments correlate between graph properties (i.e. vertices, edges and sub-graphs) and the Karatsuba-like terms of big number multiplication routines and these embodiments generate and use one iteration Karatsuba-like multiplication processes for any given operand size which require the same scalar operations as recursive Karatsuba, without recursion. Embodiments are associated with the least possible number of 'scalar' multiplications. By scalar multiplications it is meant multiplications between 'slices' of big numbers or coefficients of polynomials. The embodiments can generate optimal, 'one-iteration', Karatsuba-like formulae using graphs.

Figure 13:
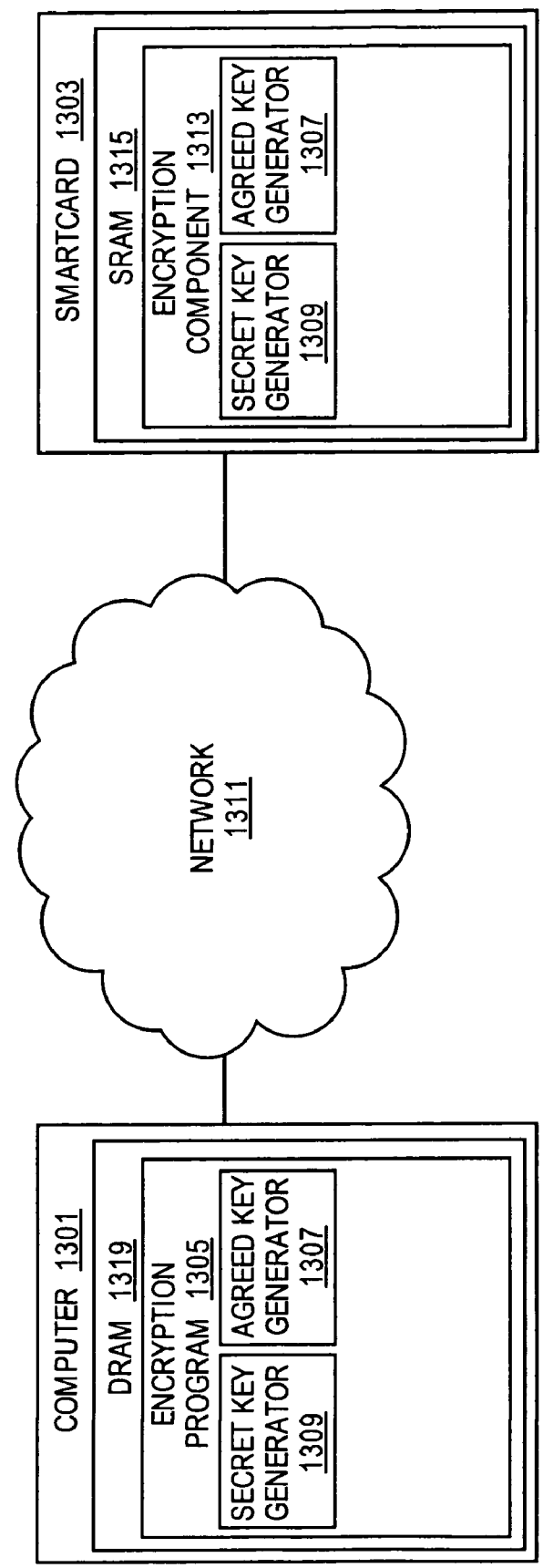
FIG. 13 illustrates an embodiment of an apparatus in a system.

Embodiments of the present invention may be implemented using hardware, software, or a combination thereof and may be implemented in one or more computer systems or other processing systems. In one embodiment, the invention is directed toward one or more computer systems capable of carrying out the functionality described herein. In another embodiment, the invention is directed to a computing device. An example of a computing device 1300 is illustrated in FIG. 13. Various embodiments are described in terms of this example of device 1300, however other computer systems or computer architectures may be used. One embodiment incorporates process 1100 in a cryptographic program. In another embodiment, process 1100 is incorporated in a hardware cryptographic device.

FIG. 13 is a diagram of one embodiment of a device utilizing an optimized encryption system. The system may include two devices that are attempting to communicate with one another securely. Any type of devices capable of communication may utilize the system. For example, the system may include a first computer 1301 attempting to communicate securely with a device. In one embodiment, the device is smartcard 1303. In other embodiments, devices that use the optimized encryption system may include, computers, handheld devices, cellular phones, gaming consoles, wireless devices, smartcards and other similar devices. Any combination of these devices may communicate using the system.

Each device may include or execute an encryption program 1305. The encryption program 1305 may be a software application, firmware, an embedded program, hardware or similarly implemented program. The program may be stored in a non-volatile memory or storage device or may be hardwired. For example, a software encryption program 1305 may be stored in system memory 1319 during use and on a hard drive or similar non-volatile storage.

System memory may be local random access memory (RAM), static RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, RDRAM® (Rambus® dynamic random access memory), SDRAM (synchronous dynamic random access memory), DDR (double data rate) SDRAM, DDRn (i.e., n=2, 3, 4, etc.), etc., and may also include a secondary memory (not shown).

The secondary memory may include, for example, a hard disk drive and/or a removable storage drive, representing a floppy disk drive, a magnetic tape drive, an optical disk drive, etc. The removable storage drive reads from and/or writes to a removable storage unit. The removable storage unit represents a floppy disk, magnetic tape, optical disk, etc., which is read by and written to by the removable storage drive. As will be appreciated, the removable storage unit may include a machine readable storage medium having stored therein computer software and/or data.

The encryption program 1305 may utilize any encryption protocol including SSL (secure sockets layer), IPsec, Station-to-Station and similar protocols. In one example embodiment, the encryption program may include a Diffie-Hellman key-exchange protocol or an RSA encryption/decryption algorithm.

The encryption program 1305 may include a secret key generator 1309 component that generates a secret key for a key-exchange protocol. The encryption program 1309 may also include an agreed key generator 1307 component. The agreed key generator 1307 may utilize the secret key from the encryption component 1313 of the device 1303 in communication with the computer 1301 running the encryption program 1305. Both the secret key generator 1309 and the agreed key generator 1307 may also utilize a public prime number and a public base or generator. The public prime and base or generator are shared between the two communicating devices (i.e., computer 1301 and smartcard 1303).

The encryption program may be used for communication with devices over a network 1311. The network 1311 may be a local area network (LAN), wide area network (WAN) or similar network. The network 1311 may utilize any communication medium or protocol. In one example embodiment, the network 1311 may be the Internet. In another embodiment, the devices may communicate over a direct link including wireless direct communications.

Device 1301 may also include a communications interface (not shown). The communications interface allows software and data to be transferred between computer 1301 and external devices (such as smartcard 1303). Examples of communications interfaces may include a modem, a network interface (such as an Ethernet card), a communications port, a PCMCIA (personal computer memory card international association) slot and card, a wireless LAN interface, etc. Software and data transferred via the communications interface are in the form of signals which may be electronic, electromagnetic, optical or other signals capable of being received by the communications interface. These signals are provided to the communications interface via a communications path (i.e., channel). The channel carries the signals and may be implemented using wire or cable, fiber optics, a phone line, a cellular phone link, a wireless link, and other communications channels.

In one example embodiment, an encryption component 1313 may be part of a smartcard 1303 or similar device. The encryption component 1313 may be software stored or embedded on a SRAM 1315, implemented in hardware or similarly implemented. The encryption component may include a secret key generator 1309 and agreed key generator 1307.

In alternative embodiments, the secondary memory may include other ways to allow computer programs or other instructions to be loaded into device 1301, for example, a removable storage unit and an interface. Examples may include a program cartridge and cartridge interface (such as that found in video game devices), a removable memory chip or card (such as an EPROM (erasable programmable read-only memory), PROM (programmable read-only memory), or flash memory) and associated socket, and other removable storage units and interfaces which allow software and data to be transferred from the removable storage unit to device 1301.

In this document, the term "computer program product" may refer to the emovable storage units. These computer program products allow software to be provided to device 1301. Embodiments of the invention may be directed to such computer program products. Computer programs (also called computer control logic) are stored in memory 1319, and/or the secondary memory and/or in computer program products. Computer programs may also be received via the communications interface. Such computer programs, when executed, enable device 1301 to perform features of embodiments of the present invention as discussed herein. In particular, the computer programs, when executed, enable computer 1301 to perform the features of embodiments of the present invention. Such features may represents parts or the entire blocks 1105, 1110, 1115, 1120, 1125, 1130, 1135, 1140, 1145, 1150, 1160, 1165 and 1170 of FIGS. 11A and 11B. Alternatively, such computer programs may represent controllers of computer 1301.

In an embodiment where the invention is implemented using software, the software may be stored in a computer program product and loaded into device 1301 using the removable storage drive, a hard drive or a communications interface. The control logic (software), when executed by computer 1301, causes computer 1301 to perform functions described herein.

Computer 1301 and smartcard 1303 may include a display (not shown) for displaying various graphical user interfaces (GUIs) and user displays. The display can be an analog electronic display, a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), etc.

In another embodiment, the invention is implemented primarily in hardware using, for example, hardware components such as application specific integrated circuits (ASICs) using hardware state machine(s) to perform the functions described herein. In yet another embodiment, the invention is implemented using a combination of both hardware and software.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A computer implemented method for optimizing a multiplication of large numbers in an encryption process, the method comprising:
   determining a plurality of factors from an input operand length;
   associating each factor of the plurality of factors with a level of a plurality of interconnected graphs in a hierarchy of graphs;
   determining a plurality of generalized edges and a plurality of vertices from the plurality of interconnected graphs, the plurality of generalized edges including a plurality of spanning edges and a plurality of spanning planes;
   determining a first plurality of products for the plurality of vertices;
   determining a second plurality of products for the plurality of spanning edges and the plurality of spanning planes;
   creating, via a computing device, a plurality of coefficients for a polynomial representing a product of input operands from the first plurality of products and the second plurality of products; and
   optimizing an encryption process in the computing device by using the plurality of coefficients in a multiplication portion of the encryption process.

2. The method of claim 1, wherein the hierarchy of graphs include a plurality of generalized graphs and a plurality of simple graphs, the plurality of simple graphs having a plurality of simple vertices and a plurality of simple edges.

3. The method of claim 1, wherein determining the plurality of generalized edges and the plurality of vertices comprises associating each of the plurality of simple vertices with a global index, a local index sequence and a semi-local index sequence.

4. The method of claim 1, wherein the first plurality of products are determined for graphs having interconnecting vertices.

5. The method of claim 1, further comprising:
   decomposing a generalized edge into the plurality of spanning edges and the plurality of spanning planes.

6. The method of claim 1, wherein creating the plurality of coefficients further includes using a plurality of diagonals determined from graphs associated with the first plurality of products and the second plurality of products, wherein the creating the plurality of coefficients is completed after a last generalized edge is processed.

7. The method of claim 6, wherein the creating of the plurality of coefficients includes:
   performing a generate products process; and
   performing a generate subtractions process.

8. The method of claim 1, wherein the second plurality of products is determined using the following equation $$P^\alpha = \{P(\{v_{(i_0)\ldots(i_{q0})\ldots(i_{q1})\ldots(i_{qm-1})\ldots(i_{L-1})}^{(L-1)}, \\ v_{(i_0)\ldots(i_{q0})\ldots(i_{q1})\ldots(i_{qm-1})\ldots(i_{L-1})_{(L-1)}}, \\ v_{(i_0)\ldots(i_{q0})\ldots(i_{q1}')\ldots(i_{qm-1})\ldots(i_{L-1})_{(L-1)}}, \\ v_{(i_0)\ldots(i_{q0})\ldots(i_{q1}')\ldots(i_{qm-1})\ldots(i_{L-1})_{(L-1)}}, \ldots \\ v_{(i_{q0})\ldots(i_{q0}')\ldots(i_{q1}')\ldots(i_{qm-1}')\ldots(i_{L-1})_{(L-1)}}\}): i_j \in [0, n_j-1] \forall j \in [0, L-1], (i_{q_k} \in [0, n_{q_k}-1] \, \hat{i}_{q_k} \neq i_{q_k}') \forall k \in [0, m-1], 0 \leq q_0 \leq q_1 \leq \ldots \leq q_{m-1}, m \in [0, L]\},$$

where $P^\alpha$ represents the second plurality of products, v represents a vertex, L represents a level, q represents position and i represents a local index.

9. An apparatus for generating encryption keys, the apparatus comprising:
   a computer coupled to a memory, the computer configured to execute an encryption program in the memory, the encryption program including a multiplication portion to perform multiplication of input operands, the multiplication portion including graph based functions to generate a plurality of coefficients representing products returned from the multiplication portion to generate encryption keys, wherein the graph based functions represent the input operands as a plurality of interconnected graphs in a hierarchy, the plurality of interconnected graphs including a plurality of spanning edges, a plurality of spanning planes and a plurality of diagonals.

10. The apparatus of claim 9, wherein the graph based functions include:
an associating function to associate each factor of a plurality of factors generated from the input operands with a level of the plurality of interconnected graphs, the level is in the hierarchy;
a definition function to define a plurality of generalized edges and a plurality of vertices from the plurality of interconnected graphs, the plurality of generalized edges including the plurality of spanning edges and the plurality of spanning planes;
a multiplying function to determine a first plurality of products for the plurality of vertices and to determine a second plurality of products for the plurality of spanning edges and the plurality of spanning planes;
a decomposition function to perform subtractions of a periphery from graphs associated with the first plurality of products and the second plurality of products to determine the plurality of diagonals; and
a finalization function to generate the plurality of coefficients from the plurality of diagonals.

11. The apparatus of claim 10, wherein the plurality of interconnected graphs include a plurality of generalized graphs and a plurality of simple graphs, the plurality of simple graphs having a plurality of simple vertices and a plurality of simple edges.

12. The apparatus of claim 10, further comprising: wherein the multiplying function determines the second plurality of products using the following equation $$P^a = \{P(\{v_{(i_0)}\ldots(i_{q0})\ldots(i_{q1})\ldots(i_{qm-1})\ldots(i_{L-1})^{(L-1)}, v_{(i_0)}\ldots(i_{q0}')\ldots(i_{q1})\ldots(i_{qm-1})\ldots(i_{L-1})^{(L-1)}, v_{(i_0)}\ldots(i_{q0})\ldots(i_{q1}')\ldots(i_{qm-1})\ldots(i_{L-1})^{(L-1)}, \ldots v_{(i_0)}\ldots(i_{q0}')\ldots(i_{q1}')\ldots(i_{qm-1})\ldots(i_{L-1})^{(L-1)}, v_{(i_{q0})}\ldots(i_{q0}')\ldots(i_{q1}')\ldots(i_{qm-1}')\ldots(i_{L-1})^{(L-1)}\}): i_j \in [0, n_j-1] \forall j \in [0,L-1], (i_{q_k} \in [0, n_{q_k}-1] \; i_{q_k} \neq i_{q_k}') \forall k \in [0, m-1], 0 \leq q_0 \leq q_1 \leq \ldots \leq q_{m-1}, m \in [0,L]\},$$

where $P^a$ represents the second plurality of products, v represents a vertex, L represents a level, q represents position and i represents a local index.

13. A machine-readable storage medium containing instructions that, when executed, cause a machine to:
determine a plurality of factors from an input operand;
associate each factor of the plurality of factors with a level of a plurality of interconnected graphs in a hierarchy of graphs;
determine a plurality of generalized edges and a plurality of vertices from the plurality of interconnected graphs, the plurality of generalized edges including a plurality of spanning edges and a plurality of spanning planes;
determine a first plurality of products for the plurality of vertices;
determine a second plurality of products for the plurality of spanning edges and the plurality of spanning planes;
create a plurality of coefficients from the first plurality of products and the second plurality of products; and
optimizing an encryption process in the computing device by using the plurality of coefficients in a multiplication portion of the encryption process.

14. The machine-readable storage medium of claim 13, further containing instructions that, when executed, cause a machine to:
determine a plurality of simple vertices from the plurality of vertices; and
associate each of the plurality of simple vertices with a global index, a local index sequence and a semi-local index sequence.

15. The machine-readable storage medium of claim 13, further containing instructions that, when executed, cause a machine to:
decompose a generalized edge into the plurality of spanning edges and the plurality of spanning planes.

16. The machine-readable storage medium of claim 13, further containing instructions that, when executed, cause a machine to: create the plurality of coefficients using a plurality of diagonals determined from graphs associated with the first plurality of products and the second plurality of products, wherein the creating the plurality of coefficients is completed after a last generalized edge is processed, and the second plurality of products is determined using the following equation $$P^a = \{P(\{v_{(i_0)}\ldots(i_{q0})\ldots(i_{q1})\ldots(i_{qm-1})\ldots(i_{L-1})^{(L-1)}, v_{(i_0)}\ldots(i_{q0}')\ldots(i_{q1})\ldots(i_{qm-1})\ldots(i_{L-1})^{(L-1)}, v_{(i_0)}\ldots(i_{q0})\ldots(i_{q1}')\ldots(i_{qm-1})\ldots(i_{L-1})^{(L-1)}, \ldots v_{(i_0)}\ldots(i_{q0}')\ldots(i_{q1}')\ldots(i_{qm-1})\ldots(i_{L-1})^{(L-1)}, v_{(i_{q0})}\ldots(i_{q0}')\ldots(i_{q1}')\ldots(i_{qm-1}')\ldots(i_{L-1})^{(L-1)}\}): i_j \in [0, n_j-1] \forall j \in [0,L-1], (i_{q_k} \in [0, n_{q_k}-1] \; i_{q_k} \neq i_{q_k}') \forall k \in [0, m-1], 0 \leq q_0 \leq q_1 \leq \ldots \leq q_{m-1}, m \in [0,L]\},$$

where $P^a$ represents the second plurality of products, v represents a vertex, L represents a level, q represents position and i represents a local index.

17. A machine-readable storage medium containing instructions generated by the execution of the instructions of the machine readable medium of claim 16.

18. A system comprising:
a first device coupled to a first memory, the first device configured to execute an encryption program in the first memory, the encryption program including a multiplication portion to perform multiplication of input operands, the multiplication portion includes a plurality of graph based functions to generate a plurality of coefficients representing products returned from the multiplication portion to generate a first key and a second key, wherein the graph based functions represent the input operands as a plurality of interconnected graphs in a hierarchy, the plurality of interconnected graphs including a plurality of spanning edges, a plurality of spanning planes and a plurality of diagonals;
a second device coupled to a second memory, the second device configured to execute the encryption program in the second memory, wherein the first device and the second device transfer encrypted data to one another over a network.

19. The system of claim 18, the plurality of graph based functions includes:
an associating function to associate each factor of a plurality of factors generated from the input operands with a level of the plurality of interconnected graphs, the level is in the hierarchy;
a definition function to define a plurality of generalized edges and a plurality of vertices from the plurality of interconnected graphs, the plurality of generalized edges including the plurality of spanning edges and the plurality of spanning planes;
a multiplying function to determine a first plurality of products for the plurality of vertices and to determine a second plurality of products for the plurality of spanning edges and the plurality of spanning planes;
a decomposition function to perform subtractions of a periphery from graphs associated with the first plurality of products and the second plurality of products to determine the plurality of diagonals; and
a finalization function to generate the plurality of coefficients from the plurality of diagonals.

20. The system of claim 19, wherein the second plurality of products is determined by the equation $$P^a = \{P(\{v_{(i_0) \ldots (i_{q0}) \ldots (i_{q1}) \ldots (i_{qm-1}) \ldots (i_{L-1})}^{(L-1)},$$
$$v_{(i_0) \ldots (i_{q0'}) \ldots (i_{q1}) \ldots (i_{qm-1}) \ldots (i_{L-1})}^{(L-1)},$$
$$v_{(i_0) \ldots (i_{q0}) \ldots (i_{q1'}) \ldots (i_{qm-1}) \ldots (i_{L-1})}^{(L-1)},$$
$$v_{(i_0) \ldots (i_{q0'}) \ldots (i_{q1'}) \ldots (i_{qm-1}) \ldots (i_{L-1})}^{(L-1)}, \ldots$$
$$v_{(i_{q0}) \ldots (i_{q0'}) \ldots (i_{q1'}) \ldots (i_{qm-1'}) \ldots (i_{L-1})}^{(L-1)}\}) : i_j \in [0, n_j-1] \forall j \in [0, L-1], (i_{q_k} \in [0, n_{q_k}-1] \hat{} i_{q_k} \neq i_{q_k'}) \forall k \in [0, m-1], 0 \leq q_0 \leq q_1 \leq \ldots \leq q_{m-1}, m \in [0, L]\},$$

where $P^a$ represents the second plurality of products, v represents a vertex, L represents a level, q represents position and i represents a local index.

21. The system of claim 18, wherein the first memory is a double data rate (DDRn) synchronous dynamic random access memory (SDRAM), wherein n is an integer equal to or greater than 2.

22. The system of claim 18, wherein the network is one of a wired and wireless.

23. The system of claim 18, wherein the second device is one of a smartcard, a personal digital assistant (PDA), a cellular telephone and a gaming console.

24. A computer implemented method comprising:
generating, via a computing device configured to execute an encryption program, a plurality of graphs pertaining to a first operand and a second operand, the plurality of graphs being interconnected in a hierarchy, the plurality of graphs having a plurality of vertices, a plurality of edges, a plurality of spanning edges, a plurality of spanning planes and a plurality of diagonals;
providing the plurality of vertices, the plurality of edges, the plurality of spanning edges, the plurality of spanning planes and the plurality of diagonals to perform multiplication of the first operand and the second operand without using recursion to generate a plurality of coefficients for the encryption program, wherein the first operand and the second operand have a size of at least a native operand size of the computing device.

25. The method of claim 24, further comprising:
determining a first plurality of products for the plurality of vertices;
determining a second plurality of products for the plurality of spanning edges and the plurality of spanning planes; and
creating the plurality of coefficients from the first plurality of products and the second plurality of products for performing the multiplication of the first operand and the second operand.

26. The method of claim 25, wherein creating the plurality of coefficients includes:
performing a generate products process; and
performing a generate subtractions process.

27. The method of claim 25, wherein the second plurality of products is determined using the following equation $$P^a = \{P(\{v_{(i_0) \ldots (i_{q0}) \ldots (i_{q1}) \ldots (i_{qm-1}) \ldots (i_{L-1})}^{(L-1)},$$
$$v_{(i_0) \ldots (i_{q0'}) \ldots (i_{q1}) \ldots (i_{qm-1}) \ldots (i_{L-1})}^{(L-1)},$$
$$v_{(i_0) \ldots (i_{q0}) \ldots (i_{q1'}) \ldots (i_{qm-1}) \ldots (i_{L-1})}^{(L-1)},$$
$$v_{(i_0) \ldots (i_{q0'}) \ldots (i_{q1'}) \ldots (i_{qm-1}) \ldots (i_{L-1})}^{(L-1)}, \ldots$$
$$v_{(i_{q0}) \ldots (i_{q0'}) \ldots (i_{q1'}) \ldots (i_{qm-1'}) \ldots (i_{L-1})}^{(L-1)}\}) : i_j \in [0, n_j-1] \forall j \in [0, L-1], (i_{q_k} \in [0, n_{q_k}-1] \hat{} i_{q_k} \neq i_{q_k'}) \forall k \in [0, m-1], 0 \leq q_0 \leq q_1 \leq \ldots \leq q_{m-1}, m \in [0, L]\},$$

where $P^a$ represents the second plurality of products, v represents a vertex, L represents a level, q represents position and i represents a local index.

\* \* \* \* \*

UNITED STATES PATENT AND TRADEMARK OFFICE
CERTIFICATE OF CORRECTION

| | | |
|---|---|---|
| PATENT NO. | : 7,844,655 B2 | Page 1 of 1 |
| APPLICATION NO. | : 11/477995 | |
| DATED | : November 30, 2010 | |
| INVENTOR(S) | : Kounavis et al. | |

It is certified that error appears in the above-identified patent and that said Letters Patent is hereby corrected as shown below:

In column 29, at line 36 after, -- 10, -- delete "further comprising:".

Signed and Sealed this
Fifth Day of July, 2011

David J. Kappos
*Director of the United States Patent and Trademark Office*